United States Patent [19]

Salmon et al.

[11] Patent Number: 5,592,375
[45] Date of Patent: Jan. 7, 1997

[54] COMPUTER-ASSISTED SYSTEM FOR INTERACTIVELY BROKERING GOODS OR SERVICES BETWEEN BUYERS AND SELLERS

[75] Inventors: Bardwell C. Salmon, Weston; John D. Borgman, Acton; Thomas O. Holtey, Newton, all of Mass.

[73] Assignee: Eagleview, Inc., Weston, Mass.

[21] Appl. No.: 212,349

[22] Filed: Mar. 11, 1994

[51] Int. Cl.$^6$ .............................. G06F 17/60; G06F 19/00
[52] U.S. Cl. ............................ 395/207; 364/408; 395/209; 395/222; 395/605
[58] Field of Search ...................................... 364/401, 402, 364/403, 407, 419.19, 408

[56] References Cited

PUBLICATIONS

"A Nationwide Home Listing Network", The Boston Globe, Nov. 21, 1993, p. A91, A94.

*Primary Examiner*—Robert A. Weinhardt
*Attorney, Agent, or Firm*—Fish & Richardson P.C.

[57] ABSTRACT

A computer-implemented system for brokering transactions between sellers and a buyer of goods or services, including a database, a seller interface, and a buyer's interface. The database contains information, including multimedia information, descriptive of respective ones of the goods or services. The seller interface enables the sellers to interactively enter information, including multimedia information, into the database. The buyer's interface provides a knowledge-based interactive protocol, enabling the buyer to select and review the descriptive information from the database, and makes perceptible the multimedia information in response to an interactive buyer request.

11 Claims, 46 Drawing Sheets

202

| Product ID | Name-Last | Name-First | Street | ZIP | Phone |
|---|---|---|---|---|---|
| | | 204 | 206 | | 208 |
| P00001 | Salmon | Douglas B. | 64 Chestnut St. -Apt. 2 | 02129 | 617-241-0801 |
| P00002 | Jones | Sandy | 26 Whitehorse Drive | 01779 | ... |
| P00003 | Doe | Kathy | ... | ... | ... |
| P00004 | Smith | Fred | ... | ... | ... |
| P00005 | ... | ... | | | |
| P00006 | ... | ... | | | |
| P00007 | ... | ... | | | |
| P00008 | ... | ... | | | |

| Product ID | Position | | | | | | Compensation | | Education | | | | Location |
|---|---|---|---|---|---|---|---|---|---|---|---|---|---|
| | I.C. | Supv | Mgr | Dir | VP | Pres. | BofD | Low | High | Bach | Mast. | Doc. | Other | |
| | 210 | | | | | | | 212 | | 214 | | | | |
| P00001 | X | X | | | | | | 40000 | 60000 | X | | | | NA/USNE |
| P00002 | X | X | X | | | | | 38000 | 55000 | X | | | | NA/USNE |
| P00003 | | X | X | X | | | | 55000 | 72000 | X | X | | | ... |
| P00004 | X | | | | X | | | 28000 | 32000 | | | | | ... |
| P00005 | X | X | X | X | | | | ... | ... | X | X | | | ... |
| P00006 | | X | X | | | X | | ... | ... | X | X | X | | ... |
| P00007 | | | | | | | X | ... | ... | | | | | ... |
| P00008 | X | X | X | X | X | X | X | ... | ... | | | | X | ... |

FIG. 2a

| Product ID | Video File 228 | Screen Text 222 | Screen ID 224 | Screen Position 226 |
|---|---|---|---|---|
| P00001 | VST765.VID | ST256 | S0232 | 1A |
| P00003 | VGY628.VID | ST256 | S0187 | 2B |
| P00005 | VAP299.VID | ST688 | S0369 | 1A |
| P00006 | VBY903.VID | ST256 | S0187 | 1A |
| P00008 | VJT364.VID | ST256 | S0673 | 1A |
| P00008 | VJT365.VID | ST256 | S0673 | 1A |
| P00008 | VJT366.VID | ST256 | S0232 | 1A |
| P00008 | VJT367.VID | ST256 | S0232 | 2C |
| P00011 | VWKI09.VID | ST376 | S0232 | 1A |
| P00012 | VJT583.VID | ST472 | S0187 | 2B |
| P00012 | VOR227.VID | ST472 | S0187 | 2C |

| Product ID | Audio File 242 | Associated Text 243 | Screen ID 244 | Screen Position 245 |
|---|---|---|---|---|
| P00001 | ART765.WAV | ST832 | S0232 | 3A |
| P00004 | ATG457.WAV | ST832 | S0187 | 4B |
| P00005 | AGA652.WAV | ST832 | S0369 | 3A |
| P00006 | ABTI27.WAV | ST832 | S0187 | 3A |
| P00006 | ABTI28.WAV | ST832 | S0673 | 3A |
| P00006 | ABTI29.WAV | ST675 | S0673 | 3A |
| P00011 | ADI478.WAV | ST676 | S0232 | 3A |
| P00011 | ADI479.WAV | ST677 | S0232 | 4C |
| P00011 | ADI480.WAV | ST676 | S0232 | 3A |
| P00012 | ANU257.WAV | ST676 | S0187 | 4B |
| P00012 | ANU258.WAV | ST677 | S0187 | 4C |

← 240

| Product ID 262 | Component ID 263 | Prev Link 264 | Industry Broad 265 | Industry Narrow 266 | Industry Specialization 267 |
|---|---|---|---|---|---|
| P00001 | 001 | null | SubAssemblies | Elect. Subsystems | |
| P00001 | 006 | null | SubAssemblies | SemiCond. Devices | |
| P00001 | 011 | null | SubAssemblies | Other | |
| P00002 | 001 | null | Aerospace | Commercial Aircraft | |
| P00002 | 004 | null | Biotechnology | Pharmeculicals | |
| P00003 | 001 | null | Finance | Loans | Consumer |
| P00003 | 004 | null | Finance | Investment | Real Estate |
| ... | ... | ... | ... | ... | ... |

FIG. 2d

| Product ID 272 | Component ID 273 | Prev Link 274 | Function Broad 275 | Function Narrow 276 |
|---|---|---|---|---|
| P00001 | 002 | 001 | Marketing/Sales | Marketing |
| P00001 | 007 | 006 | Marketing/Sales | Sales |
| P00002 | 002 | 001 | Design | Product Designer |
| P00002 | 005 | 004 | Production | Technician |
| P00003 | 002 | 001 | Marketing/Sales | Loan Origination |
| ... | | | | |

FIG. 2e

| Product ID 282 | Component ID 283 | Prev Link 284 | Skill 285 |
|---|---|---|---|
| P00001 | 003 | 002 | Advertising |
| P00003 | 003 | 002 | Kitchen Design |
| ... | | | |

EagleView Inc.

File  Edit  Page  Help

Weighted Summary with Combination Characteristics

Position Name: ASIC Sales Mg

Req#: 403

- Industry — SubAssemblies — 5 — 664, 662, 660
- Function — Marketing/Sales — 660, 666
- SkillSet — Direct/OEM/Telemarketing/Rep — 10 — 664, 662, 666
- Position — Individual/Supervisor/Manager — 5 — 666, 668
- Combination Characteristics — SubAssemblies, Marketing/Sales — 20 — 674, 676 (EVERY / ANY)

- Compensation: 70 to 100 — 20
- Education: Master — 10
- Location: North America — 0
- Other: Key Word — 70

☐ Approved

| opportunity | business | technology | stage | location | capital | ... |
|---|---|---|---|---|---|---|
| NorthCor | Mfg. | robotics | 1st round | Detroit | $2M | |
| Southwell | pharmaceutical | fermentation | 2nd round | Austin | $12M | |
| EastElec | Electronics | ion sputtering | 1st round | Cambridge | $5M | |
| Westgo | Transportation | AntiGrav | turn-around | San Francisco | $8M | |
| ... | | | | | | |

FIG. 8a

| Location | zoning | transport | capacity | financial | video | ... |
|---|---|---|---|---|---|---|
| 1 A Street | Commercial | hiway | 4000 sqft | $35/sqft | AER6.WAV | |
| 22 D Ave | Comm/Ind | hiway | 12000 sqft | $24/sqft | ATY8.WAV | |
| 303 C Dr. | Industrial | road/rail | 80000 sqft | $12/sqft | AIO0.WAV | |
| ... | | | | | | |

FIG. 8b

COMPUTER-ASSISTED SYSTEM FOR INTERACTIVELY BROKERING GOODS OR SERVICES BETWEEN BUYERS AND SELLERS

BACKGROUND OF THE INVENTION

The invention relates to a computer-assisted system for brokering of goods or services.

In certain markets for goods or services, for instance hiring personnel, purchasing decisions are difficult because diverse characteristics of the goods or services must be evaluated and compared, but information on the goods or services is inconsistent and dispersed.

SUMMARY OF THE INVENTION

The invention provides a computer-based system to facilitate any transaction where review of diverse information is a part of the buyer's decision-making process. It allows information in a number of forms to be submitted by the seller, compiled in a database and reviewed by the buyer with the assistance of an interactive, expert system based, networked computer system.

In general, the invention features a computer-implemented system for brokering transactions between sellers and a buyer of goods or services, the system including a database, a Seller's Interface, and a Buyer's Interface. The database contains information, including multimedia information, descriptive of respective ones of the goods or services. The Seller's Interface enables the sellers to interactively enter information, including multimedia information, into the database. The Buyer's Interface provides a knowledge-based interactive protocol, enabling the buyer to select and review the descriptive information from the database, and makes perceptible the multimedia information in response to an interactive buyer request.

Preferred embodiments of the invention may include the following features. The Seller's Interface enforces entry by the seller of at least a predefined minimum set of information about each of the goods. The descriptive information includes profile vectors of optional information. The information of each profile vector is associated with other information in the profile vector but is independent of information of the other profile vectors for the same good or service. The Buyer's Interface records actions of the buyer in an action log for later use, and a report generator extracts information from the action log to provide feedback information to the buyers and/or sellers. At least one of the Seller's Interface and the Buyer's Interface has two modes, a first mode having relatively slower interactivity for use with a low-bandwidth communications channel, and a second mode having relatively faster interactivity for use with a high-bandwidth channel. The system may have automatic notification elements for notifying the buyer of descriptive information newly-entered into the database that matches selection criteria previously specified by the buyer. The Buyer's Interface may also have, two modes of operation, a first mode for specifying selection criteria for selecting descriptive information from the database, and a second mode allowing detailed study of the selected descriptive information. The knowledge-based protocol includes an approximate-comparison system, for presenting to the buyer, goods or services that approximately match selection criteria entered into the Buyer's Interface. In one approximate-comparison system, the buyer is presented those goods or services that meet user-defined required criteria, and closely meet user-defined desired criteria.

The multimedia information may consist of audio and/or video, possibly in combination with text, still images, or other digital computer data. The information is edited and compiled into a coherent database with links to allow navigation through the varied portions of each product's information. The compiled information is presented to the buyer with the assistance of an expert system that selects relevant information in accordance with specified criteria. The interactive nature of the process allows rapid review of a large quantity of information, comparison of various alternatives and changes to criteria as the decision process progresses.

This system can be used in a variety of transaction applications which include, but are not limited to:

Purchase or rental of real estate, automobiles, aircraft or yachts;

Purchase or rental of consumer goods or services;

Hiring of full or part time personnel, executives, and consultants;

Exploration of travel, colleges, business opportunities, investments, alliances or technology transfers.

Among the advantages of the invention are the following. The buying process is made more productive for both the buyer and the seller by the system. It provides a database of consistent and relevant information. The seller's information is collected in an automated process to assure the completeness of the required information of a Product Profile. The seller may provide information in a variety of formats, including still images and multimedia (including audio and/or video). To further provide complete information, the system also collects information from other sources, such as personal references, product evaluations or reports. The buyer is provided an automated process to aid in selection from among a large variety of products. The information available to the buyer is presented in a consistent form. His "first cut" is made in accordance with the characteristics of his Buyer's Profile matched by the database manager against a database of Product Profiles gathered from all sellers; it is therefore both accurate and complete. Further information is accessible in various media so that a more enriched review can begin without delay. The system provides more assistance, in addition to providing common information, when the buying decision is made by a team. A record of the buying process is also made by the Action Log that contains a record of the products presented, information reviewed, buyer's scoring decisions, etc. The system allows a buyer to make a purchasing decision more quickly, both in terms of calendar days and in terms of the amount of time actually expended in the search process.

BRIEF DESCRIPTION OF THE DRAWING

FIGS. 2a–2f show database tables used in accordance with the invention.

FIGS. 6a–6e and 7a–7n are screen displays of the Buyer's Interface for the broker system of FIG. 1.

FIGS. 8a–8b show representative database tables for use with the invention.

DESCRIPTION OF THE PREFERRED EMBODIMENTS

Figure 1:
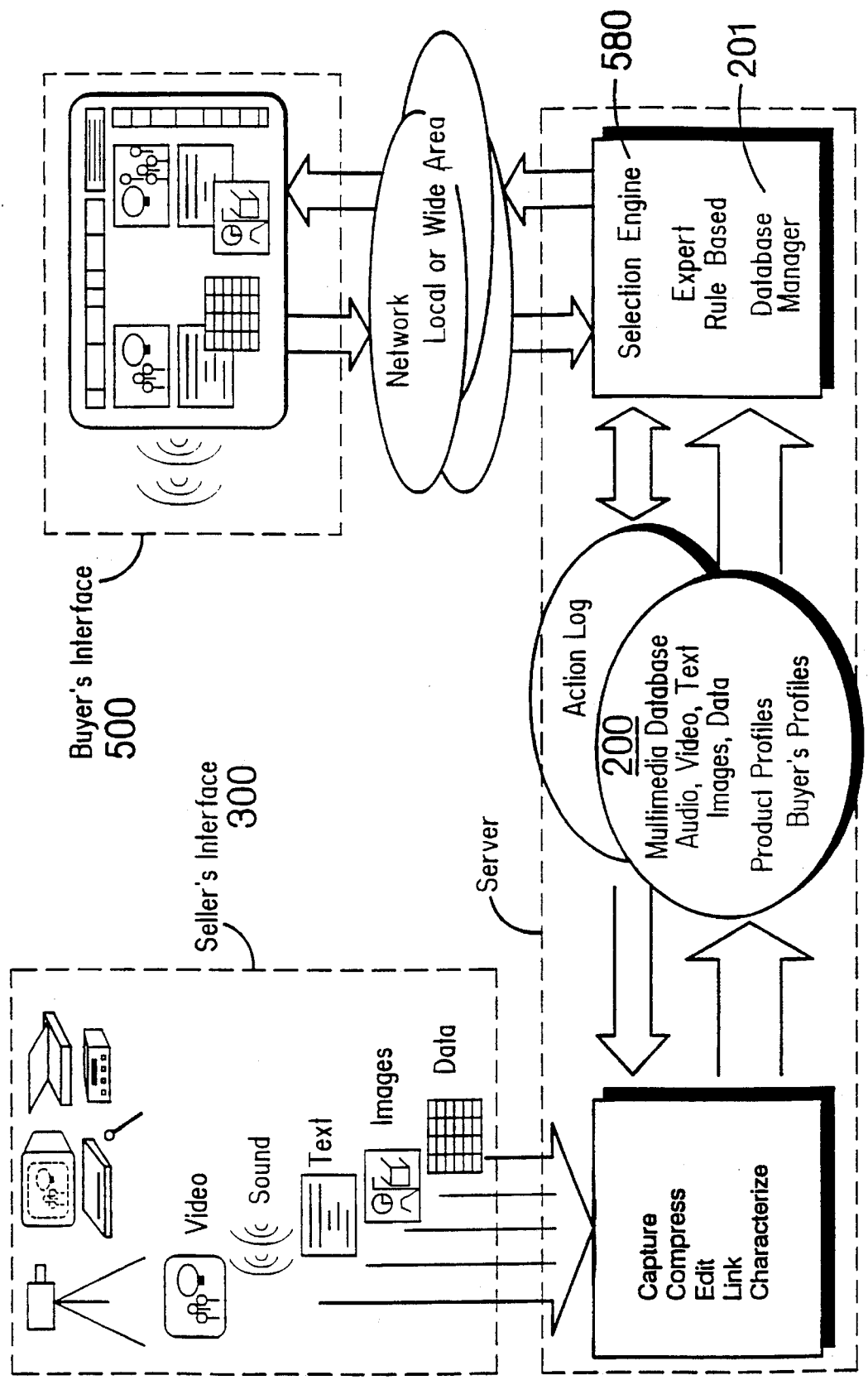
FIG. 1 is a block diagram of the broker system in accordance with the invention.

Referring to FIG. 1, a multimedia database 200 has a Seller's Interface 300 and a Buyer's Interface 500. Database 200 is arranged to provide Product Profiles, each a description of a product (goods or services) that includes the information that is important to both buyer and seller. Seller's Interface 300 automates the process of "interviewing" sellers about their products, and for each product produces a corresponding Product Profile in database 200. The Buyer's Interface 500 assists the buyer in selecting likely Product Profiles from database 200, and in evaluating and comparing products to make a purchasing decision. A Selection Engine 580 acts as an interface between the Buyer's Interface and a database manager 201 for database 200.

In one example application, personnel search, the candidate (seller) is interviewed by the Seller's Interface 300 to supply information for his Product Profile. The interview collects information such as the position the seller seeks, his desired salary and geography, and his experience. In addition to this information, free-form text such as a work sample, still images such as a resume, or multimedia information may be incorporated into his Product Profile in database 200.

The Buyer's Interface 500 presents interactive screen queries to a hiring manager (buyer) so that he can construct a "first cut" description, called a Buyer's Profile, of the products that should be studied in greater detail. Buyer's Interface 500 uses this Buyer's Profile to retrieve product profiles from the multimedia database 200, for instance using SQL queries. The system presents the candidates that closely match the Buyer's Profile. The manager can then review further information and use other facilities of Buyer's Interface 500 to assist his hiring (purchasing) decision.

The Multimedia Database

Referring to FIGS. 2a–2d, in the personnel search example, multimedia database 200 is the repository for the Product Profile information collected by the Seller's Interface. Database 200 may use a known database manager 201 using known technologies such as relational architecture and SQL access. Database 200 is organized around a product identifier as the primary database key. Each product is represented in the database by a Product Profile. Each Product Profile has two parts: a required part, and additional optional part with information included as the seller sees fit.

FIG. 2a shows the Product Table 202 of the Product Profile database in which each product occupies a row. Each table column represents a characteristic of a product. Thus, in the personnel search application, the Profile Template table for the "product" might contain information such as:

the candidate's name 204, address 206, and telephone number 208 last position or position sought 210: individual contributor (I.C.), manager (Mgr.), vice president (V.P.), etc., compensation 212—for example, minimum and maximum values education 214—bachelors (Bach.), masters (Mast.), etc., Subsidiary tables of multimedia database 200 contain other information, organized as required by the nature of the information itself, for instance, multimedia information stored for each product.

Referring to FIG. 2b, products may have variable amounts of multimedia information, and thus this multimedia information is not stored in the Product Table of FIG. 2a but rather within tables associated with each type of media. FIG. 2b shows a table 220 indexing available video files. The table shows that each of products P00001, P00003, P00005, P00006, etc. has an associated video data file 228 containing a compressed video image, and product P00008 has four associated video clips. The file's name extension (".VID" in the example) may identify the particular technology used in its compression. This table may also include a text description 222 of the video. For instance, a video answer to the question "What is your favorite activity?" would be linked to the text of the question, for display on Seller's Interface to prompt the candidate to speak, and in the Buyer's Interface to show the buyer what video clips are available. These text strings may be unique to a specific video or shared among videos associated with several products.

When the Buyer's Interface presents a particular screen, it queries the database for all video references associated with a particular product and a particular screen display 224. The database row yields the icon 226 for the video clip and the screen location at which to display the icon and the text describing the video clip, and the name of the data file 228 that contains the compressed video.

Figure 2C:

FIG. 2c illustrates a table 240 for audio information The "associated text" column 243 describes text describing the clip itself for instance, "What do you want to be doing in five years?" The Screen ID 244 and screen position 245 tell what Buyer's Interface screen and which icon on that screen are associated with the specific clip. See, for instance, FIG. 7g.

Tables similar to those of FIGS. 2b and 2c could identify text and images associated with a Product Profile.

The database designer will specify certain information as being required for a Product Profile. For the personnel search example, this information might include:

the candidate's name at least one contact mode: either a phone number or an address, for instance at least one experience entry: either an industry/function vector (discussed below in connection with FIGS. 2d–f) or a description of the candidate's education.

A candidate with "Production experience in the Biotechnology industry" and "Design experience in the Aerospace Industry" should not match a search for "Design experience in Biotechnology." Thus, the industry, function, and skill set for each resume item of a candidate is logically correlated in the database, and the data for each resume item are kept logically separate from the data for the candidate's other resume items.

FIGS. 2d–2f show how this information describing the candidates might be stored as a table 260 of "Industry Experience," a table 270 of "Functions," and a table 280 of "Skill Set." Each of these three tables is related to a screen of the Seller's Interface. The entries in the three tables are each correlated to the candidate by a "Product ID" column 262, 272, 282. The rows of the three tables are indexed by "Product ID" and "Component ID" columns 263, 273, 283. Associated rows for a single resume entry are correlated to each other by "Prior Component ID" columns 264, 274, 284.

The actual candidate information is stored in an "Industry—Broad" column 265, an "Industry—Narrow" column 266, a "Function—Broad" column 275, a "Function—Narrow" column 276, and a "Skill Set" column 285.

SQL queries constructed by the Buyer's Profile access these experience tables. These queries may attempt to match an entire row, for example, "Industry is Finance/Loans/Consumer" or may match only a partial row, for example, "TeleMarketing" experience regardless of industry.

The logical relationships between rows of the three tables are noted by the "Component ID" columns 263, 273, 283 and "Prior Component ID" columns 264, 274, 284. In the example tables of FIGS. 2d–2f, rows 296, 297, and 298 are correlated to each other. Row 298 is indexed, in columns 262 and 263, "Product P00001, Component 1." Row 297 is labelled "Product P00001, Component 2," and in link column 274, links to Component 1. Because the "Component ID" is assigned sequentially to each table row for a specific Product, "Product Component" pairs are unique among the three tables. A table join operation will discover that the "link" field of row 297 links row 297 to row 298. Similarly, row 296 links to row 297. Row 298 has a null link field 264, indicating that no further searches are required to link profile records for this experience item for Product P00001.

The Seller's Interface enforces relationships between the rows of the tables. For instance, each row of "Industry" table 260 must have at least one associated "Function" row in table 270. Each "Skill Set" row in table 280 must have at least one associated "Function" row in table 270 (and thus one associated "Industry" row).

In the example discussed above, a candidate with "Production experience in the Biotechnology industry" and "Design experience in the Aerospace Industry," is seen to be described in two vectors, stored respectively in rows 291 and 292 and rows 294 and 295. Rows 291 and 292 are linked together by link field 274 of row 292, and rows 294 and 295 are linked together by link field 274 of row 295.

Figure 6A:
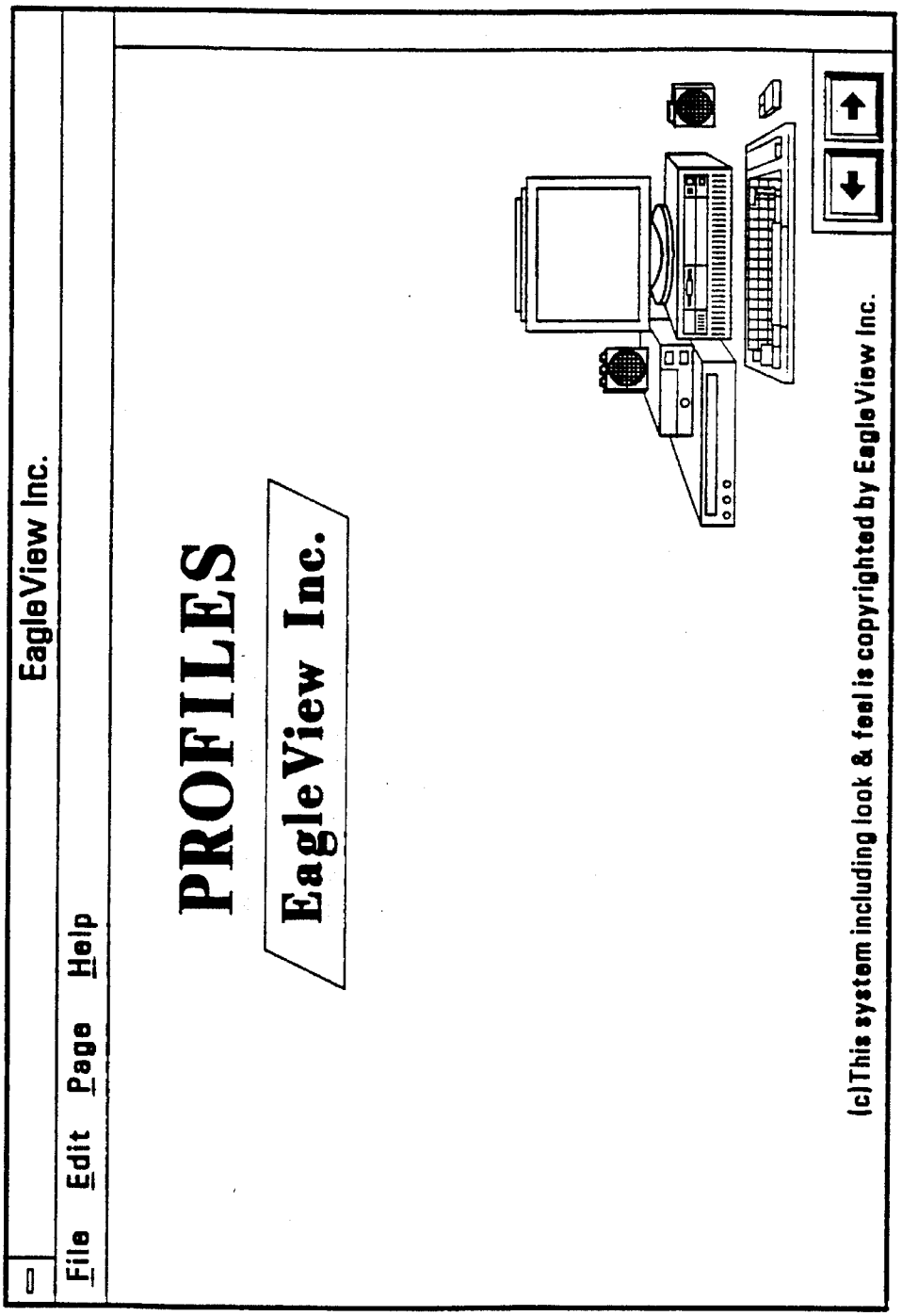
Figure 6B:
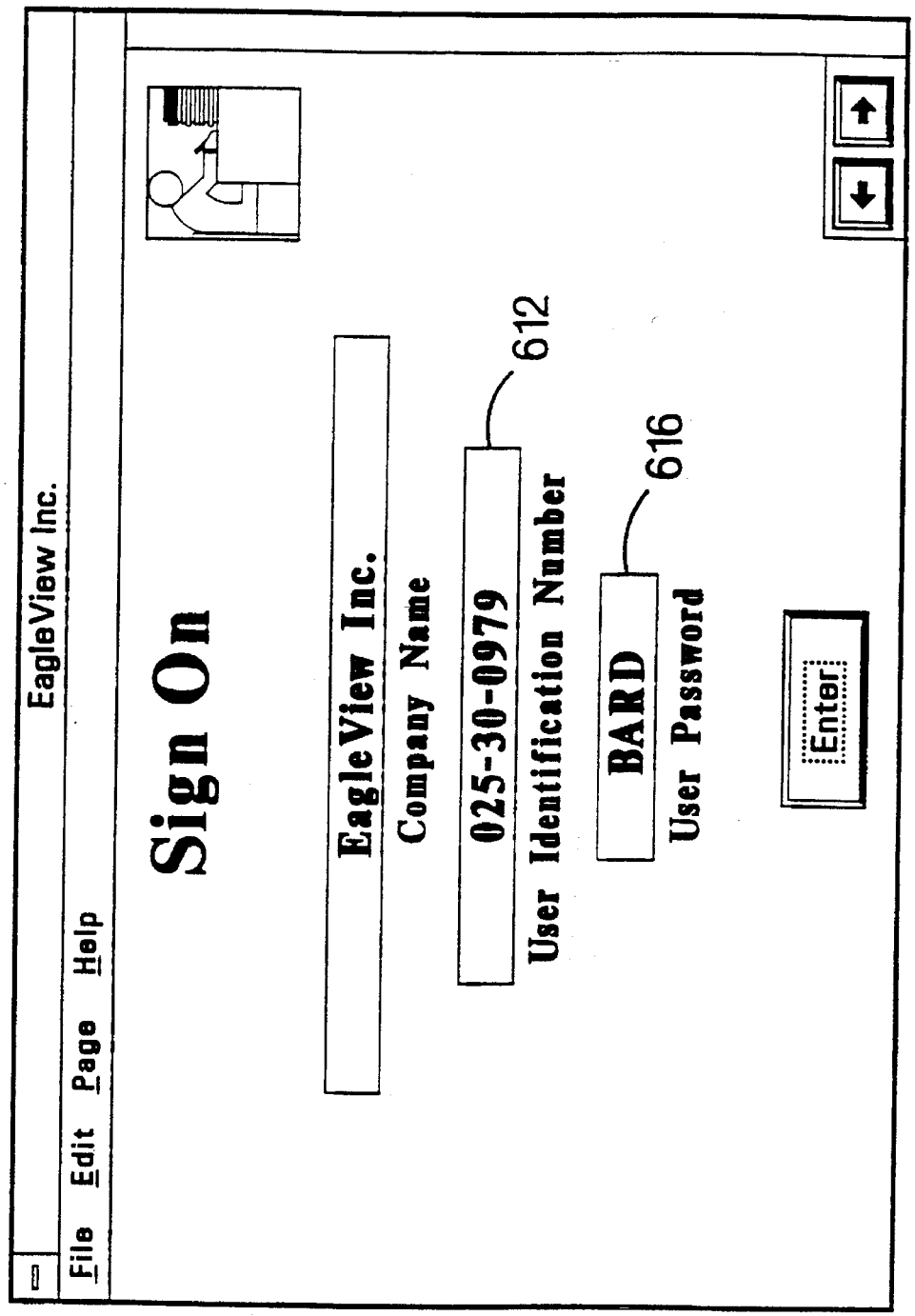
Figure 6C:
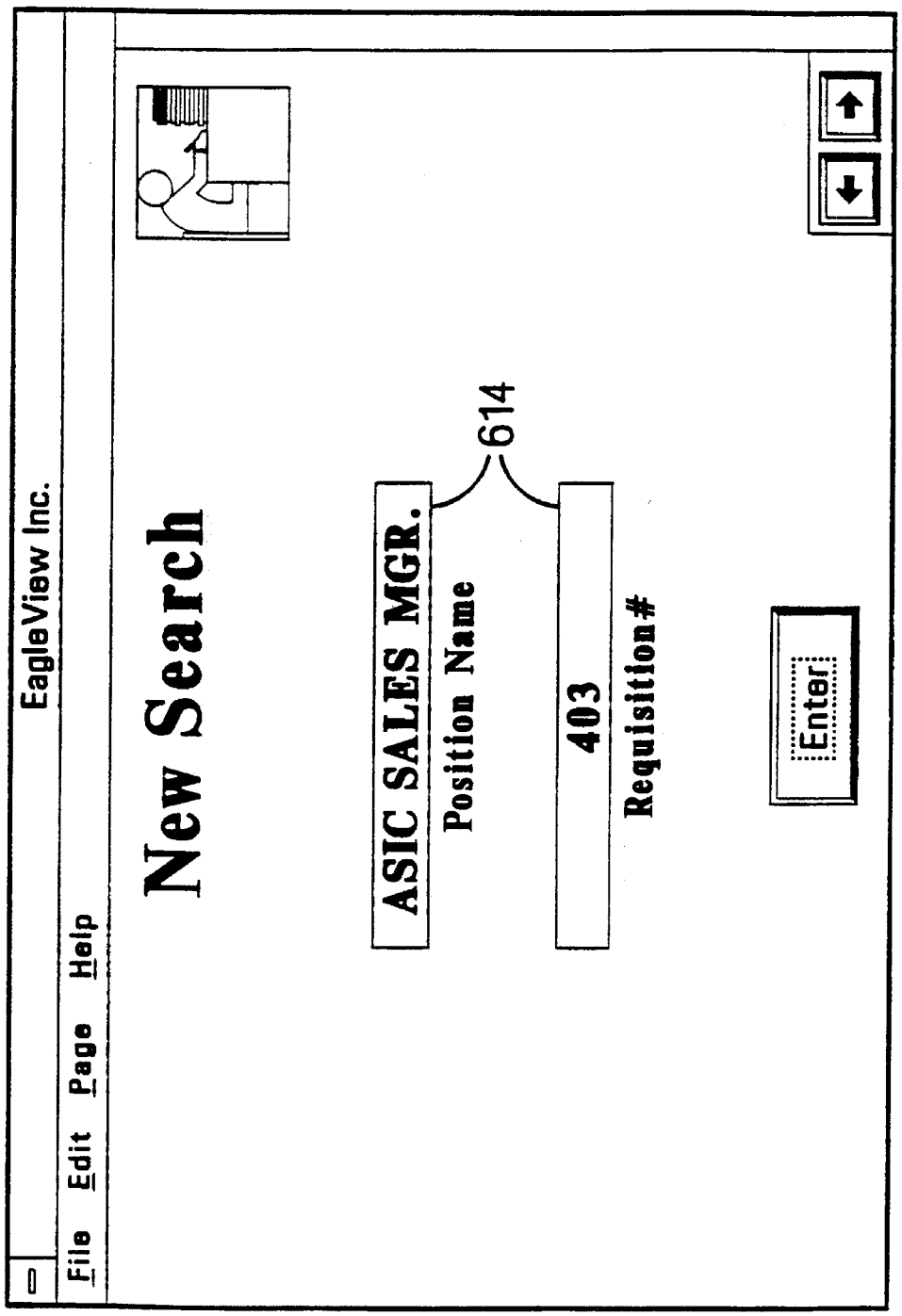
Figure 6D:
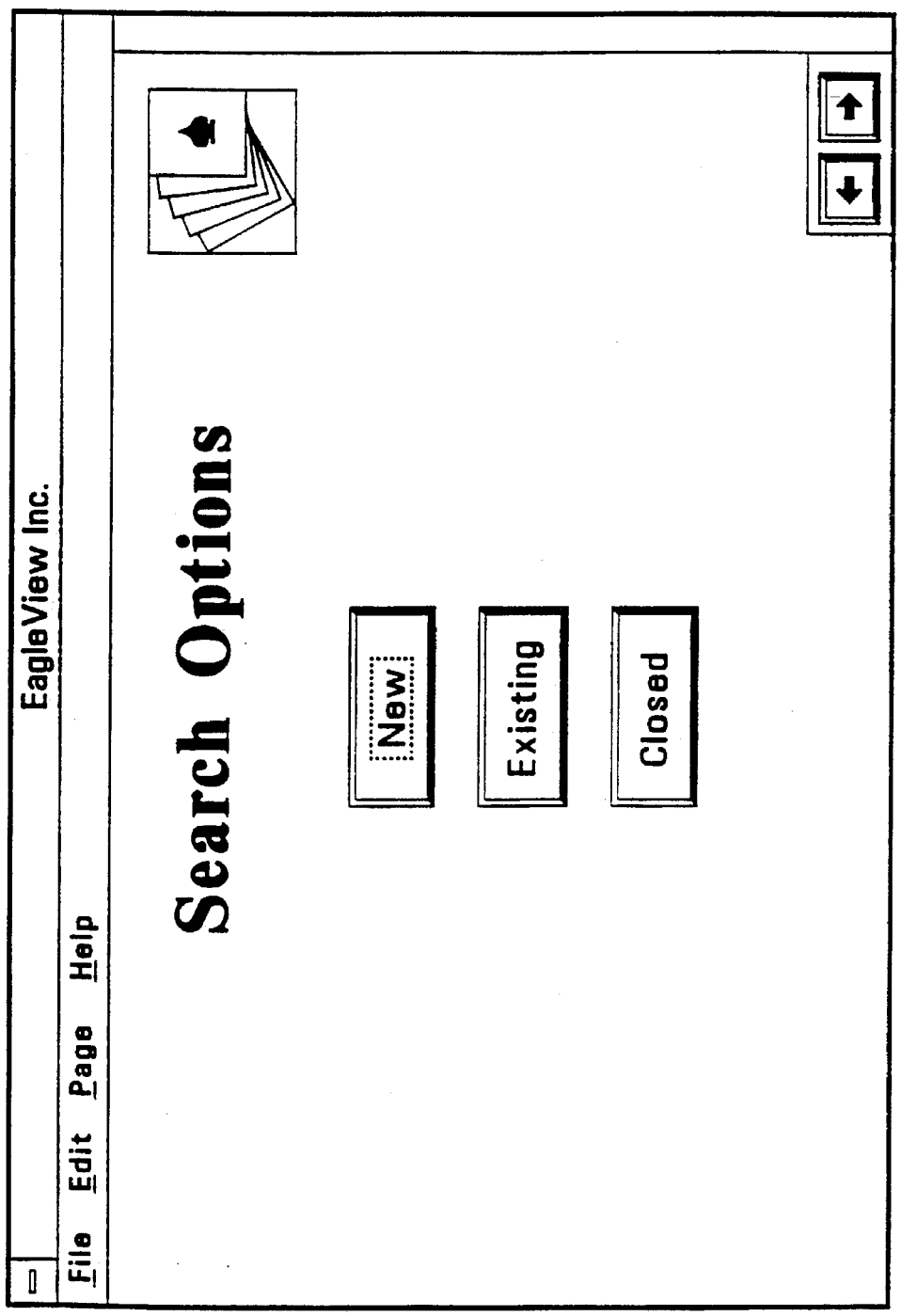

Linked rows from the three tables are considered as an integral unit when matching against a Buyer's Profile. Thus, a Buyer's Profile that specified "must have Production experience in the Aerospace industry" would not match candidate P00002 because there is no link between the linked rows 291 and 292 and the linked rows 294 and 295. As will be discussed below in connection with FIG. 6e, a Buyer's Profile that merely gave weights to the industry or experience, without using a combination rule, would match.

In an alternate database organization, the experience information of the three tables of FIGS. 2d–2f can be combined into a single table. Instead of explicitly representing links between a candidate's data, the interdata correlations are noted by storing correlated data in a common row. This single-row alternate representation requires extra space for fields that are always present though unused (for instance, a "Skill Set" entry is not required for every "Industry" and "Function" pair in the representation of FIGS. 2d–2f, but would be stored as a null entry with an "Industry/Function" pair), or is redundantly represented when a single copy suffices in FIGS. 2d–2f (where, for instance, multiple "Function" rows may be associated with a single "Industry" row). But the alternate representation frees space for the "Component ID" and "link" fields. Further, searching the single-table representation for candidates with designated combinations of "specific function within a specific industry" experience is improved because of reduced disk access. If a search is desired in which one column is a "don't care," that column can be left out of the WHERE clause of the SQL SELECT statement. The choice between the organization of FIGS. 2d–2f will depend on circumstance and experience.

The "Industry" and "Function" codes may be designed by the database designer, or for instance, taken from the Department of Labor's index of job classifications.

The Seller's Interface

Figure 3A:
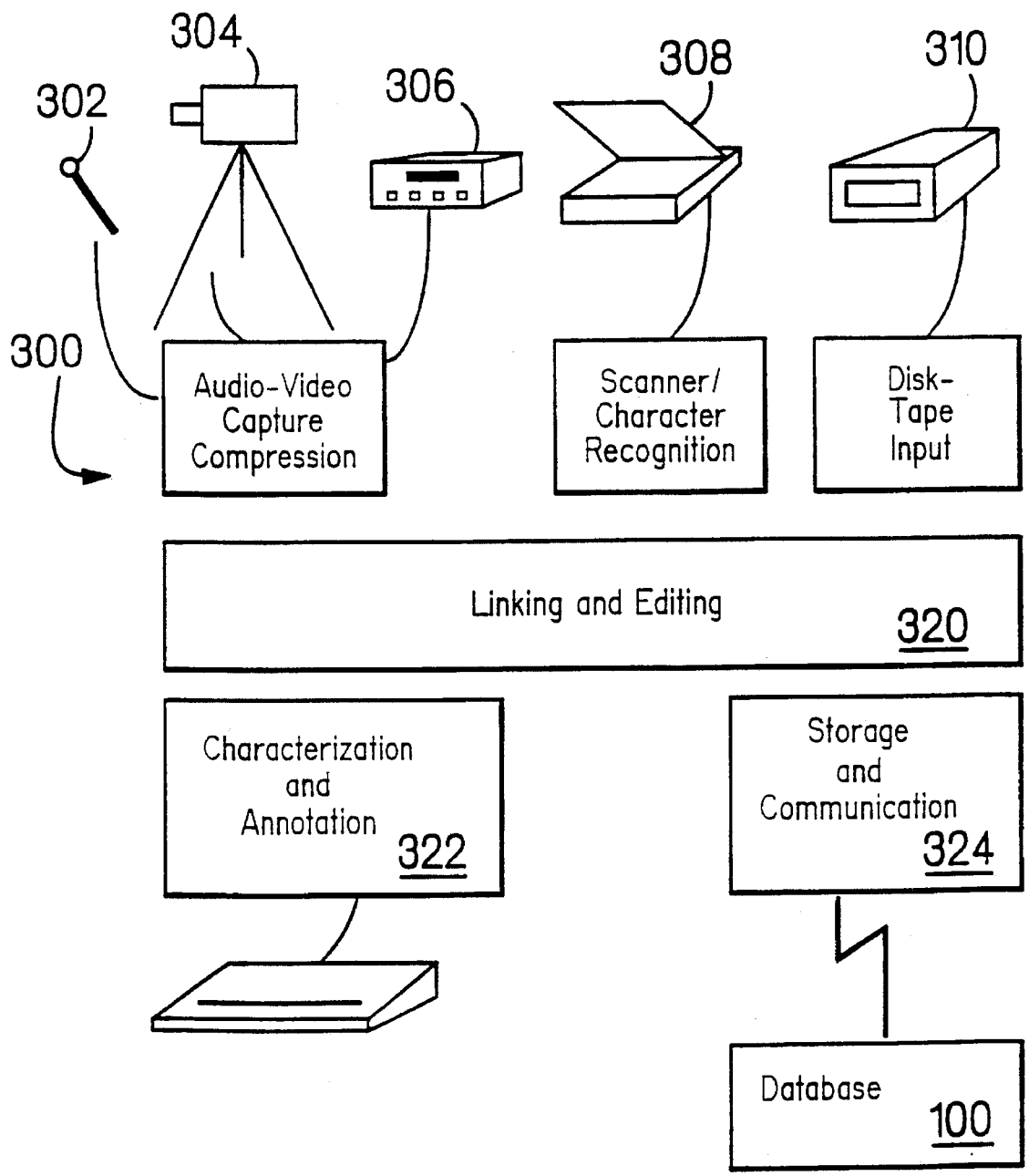
FIG. 3a is a block diagram of a workstation for the Seller's Interface for the broker system of FIG. 1.

Referring to FIG. 3a, the Product Profile information is collected from (and about) the candidate/seller/product by the automated Seller's Interface 300 to efficiently collect complete and consistent Product Profiles. In the simplest case, this collection may be performed by distributing Seller's Interface 300 as a diskette-based application to be run on a seller's personal computer. The multimedia information is collected at a workstation or automated kiosk with appropriate input devices, for instance a microphone 302 for audio input, a video camera 304 or VCR 306 for video input, a FAX machine or other scanner 308 for input of documents, and/or disk or tape input 310. Either the seller's computer or the computer that manages database 200 can also be used to edit and link (as noted at 320) the input obtained from devices 302–310. The editing computer will also generally include keyboard 322 to control its operation and enter text data, and a communications port 324 to attach to database 200.

Figure 3B:
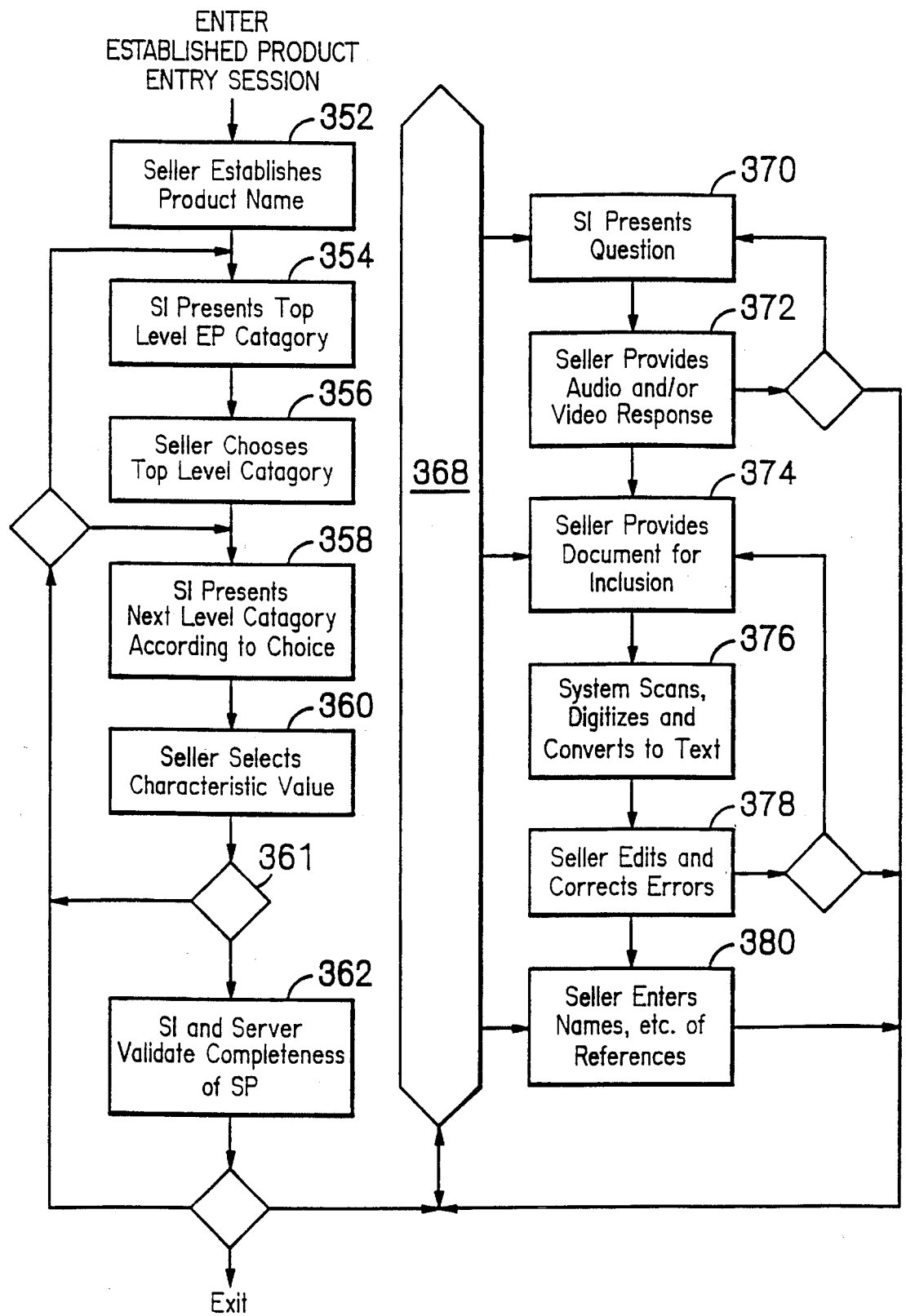
FIG. 3b is a flow-chart of the Seller's Interface for the broker system of FIG. 1.

FIG. 3b shows the process that the Seller's Interface uses to obtain a Product Profile. Seller's Interface 300 first collects the information of the Product Table of FIG. 2a. In step 352, the seller enters the product name. In step 354, the Seller's Interface presents a top level screen (FIG. 4a) showing the categories of information of a Product Profile. In step 356, the seller chooses a particular category (402 of FIG. 4a) and the Seller's Interface presents the profile characteristics appropriate to that category (FIG. 4b).

In steps 358 and 360, the seller chooses characteristics (FIG. 4c) and continues through successive screens, guided by the Product Profile structure incorporated into the Seller's Interface. In step 362, the Seller's Interface validates that at least the required information has been entered. This validation, at the time of information entry, reduces a buyer's need to later complete or clarify information. At step 361, prior to validation at step 362, (FIGS. 4d, 4g, 4i, 4k, 4m), the seller may select an additional category of information to enter, and the Seller's Interface will prompt the seller with characteristics to select among (FIGS. 4e, 4f, 4h, 4l, 4n, 4o, 4p, 4q).

Still referring to FIG. 3b, after step 362 has verified that at least the required information has been entered, the seller may either exit or enter optional additional information. In step 368 the seller selects from among the categories of additional information to add. These categories include multimedia information. In step 370, the Seller's Interface presents a series of questions such as "What was your most significant accomplishment in your most recent job?". The candidate's response to each question is captured as audio and/or video information in step 372. Some of the interview questions may be submitted to the candidate before the interview, others may not, allowing for both rehearsed and unrehearsed responses. Some general questions may be asked of all candidates while others may be asked depending on specific characteristics of the candidate's Product Profile.

In step 374, scanner 308 of Seller's Interface 300 can accept scanned-in documents, for instance work samples or a resume. The Seller's Interface may optionally run the document through a character recognizer (step 376) to produce free-from text. Selected keywords may also be identified at this time for use in retrieval. To correct character recognition errors, Seller's Interface would present the resulting text to the seller for review and correction (step 378).

The seller can enter other information in response to Seller's Interface requests, for instance contact names for personal references (step 380).

Figure 4A:
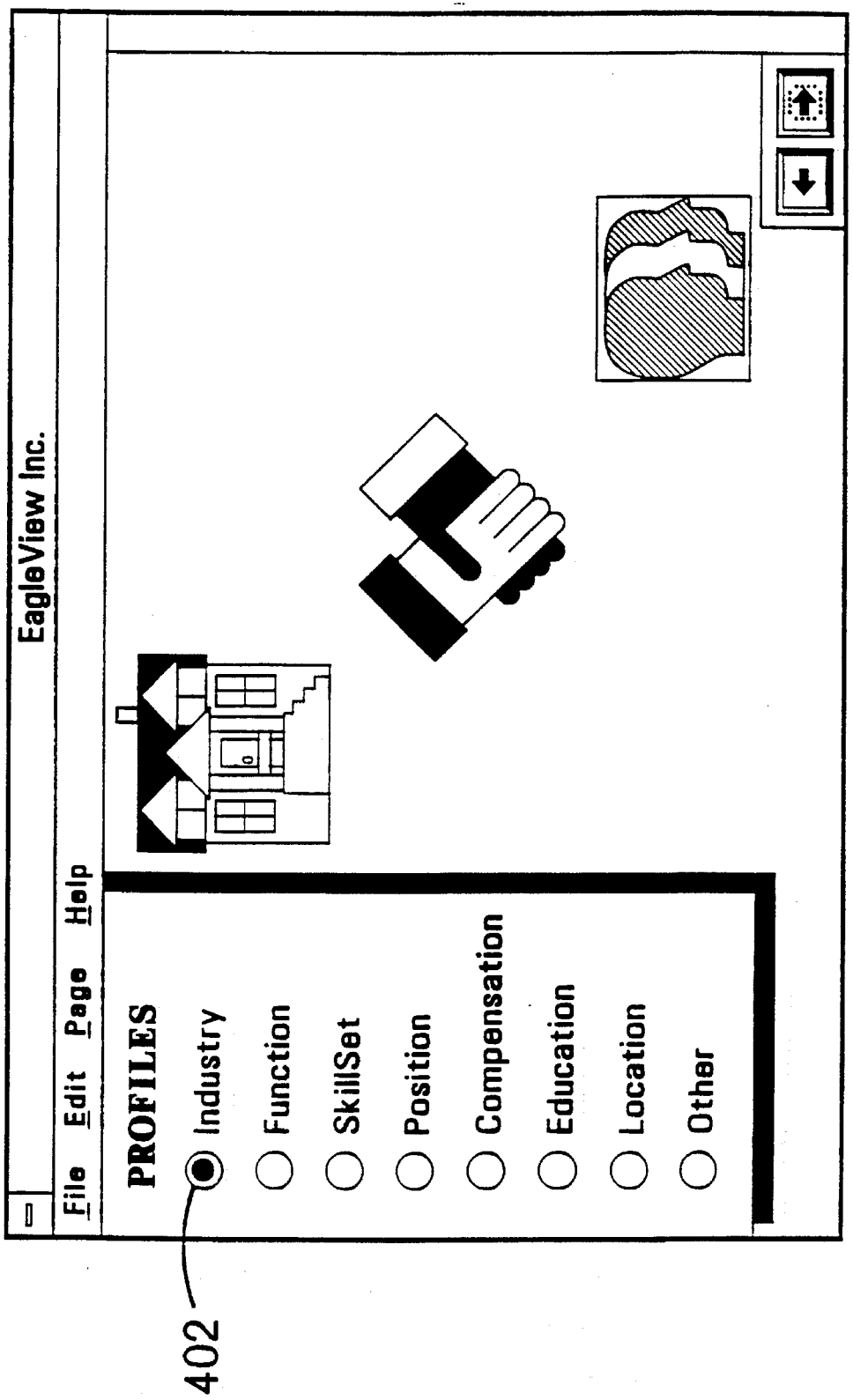
FIGS. 4a–4q are screen displays for the broker system of FIG. 1.
Figure 4B:
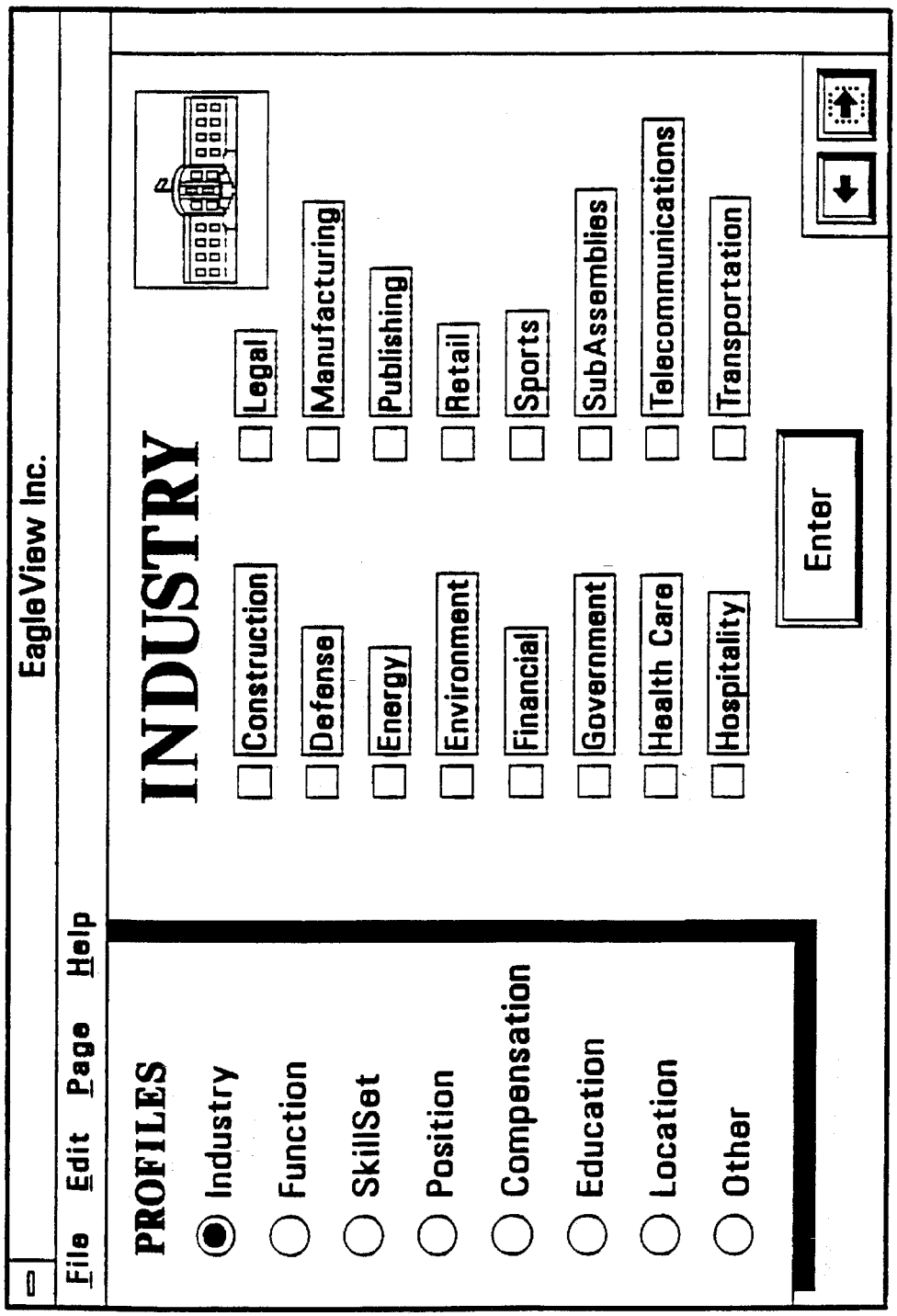
Figure 4C:
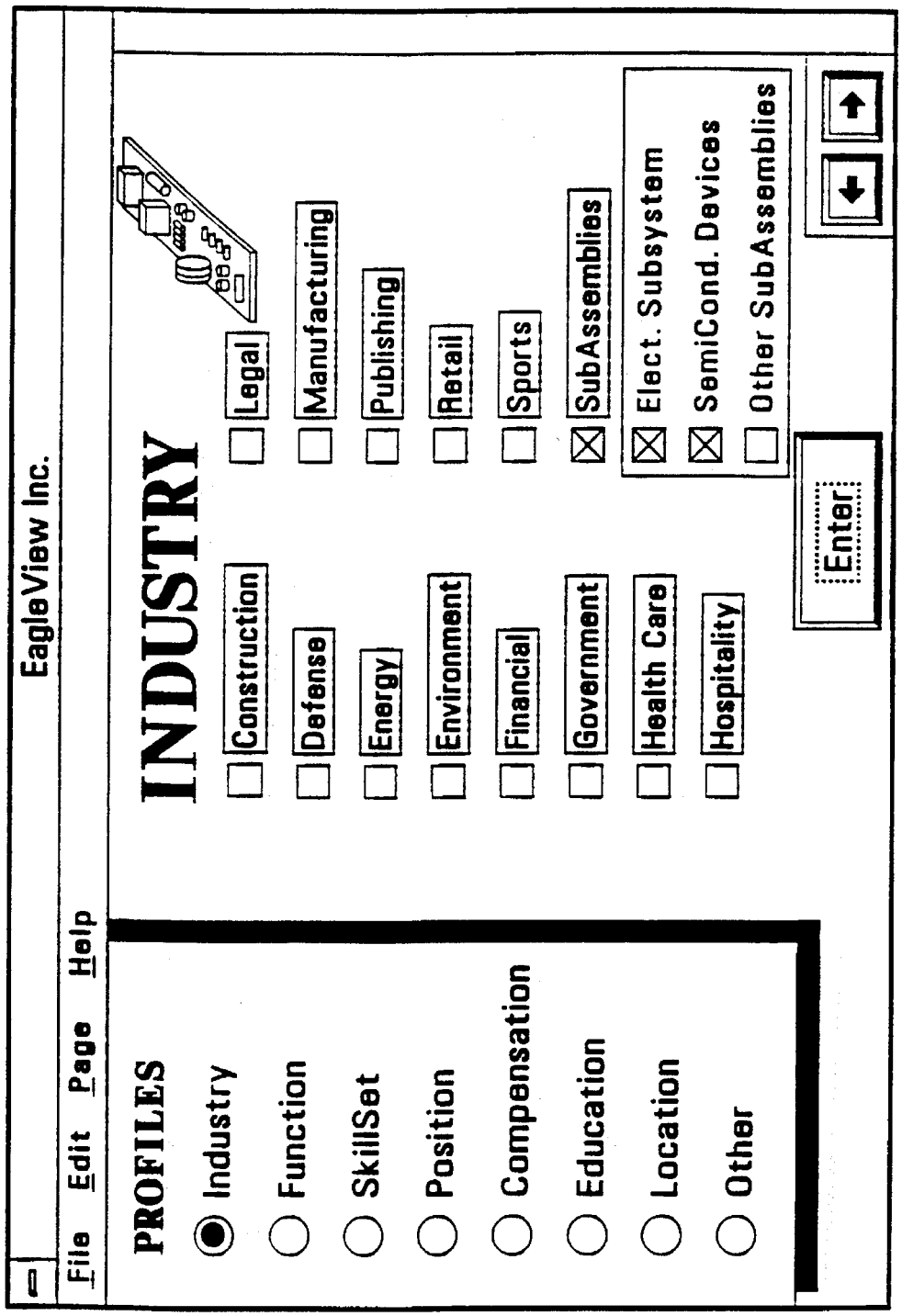
Figure 4D:
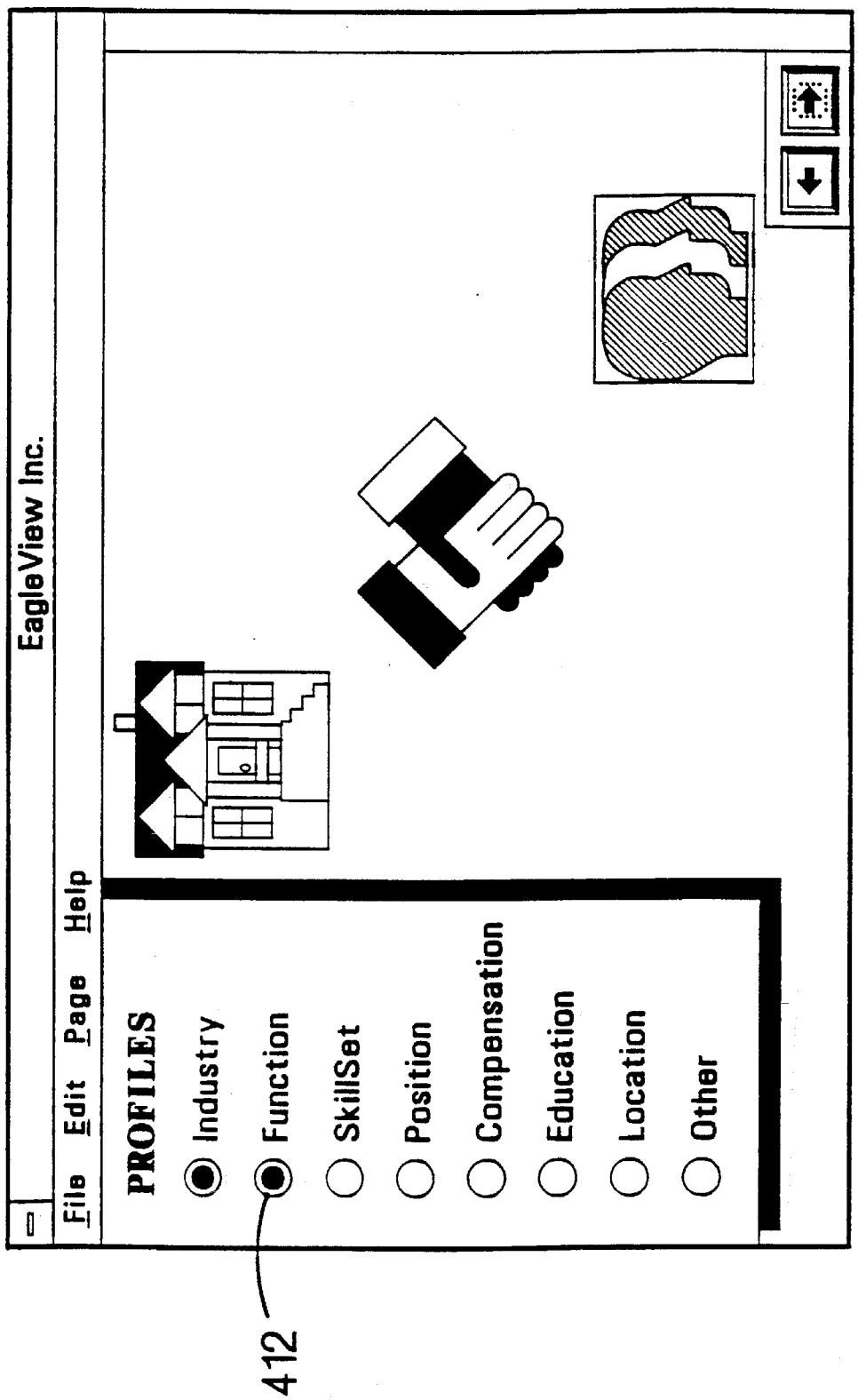
Figure 4E:
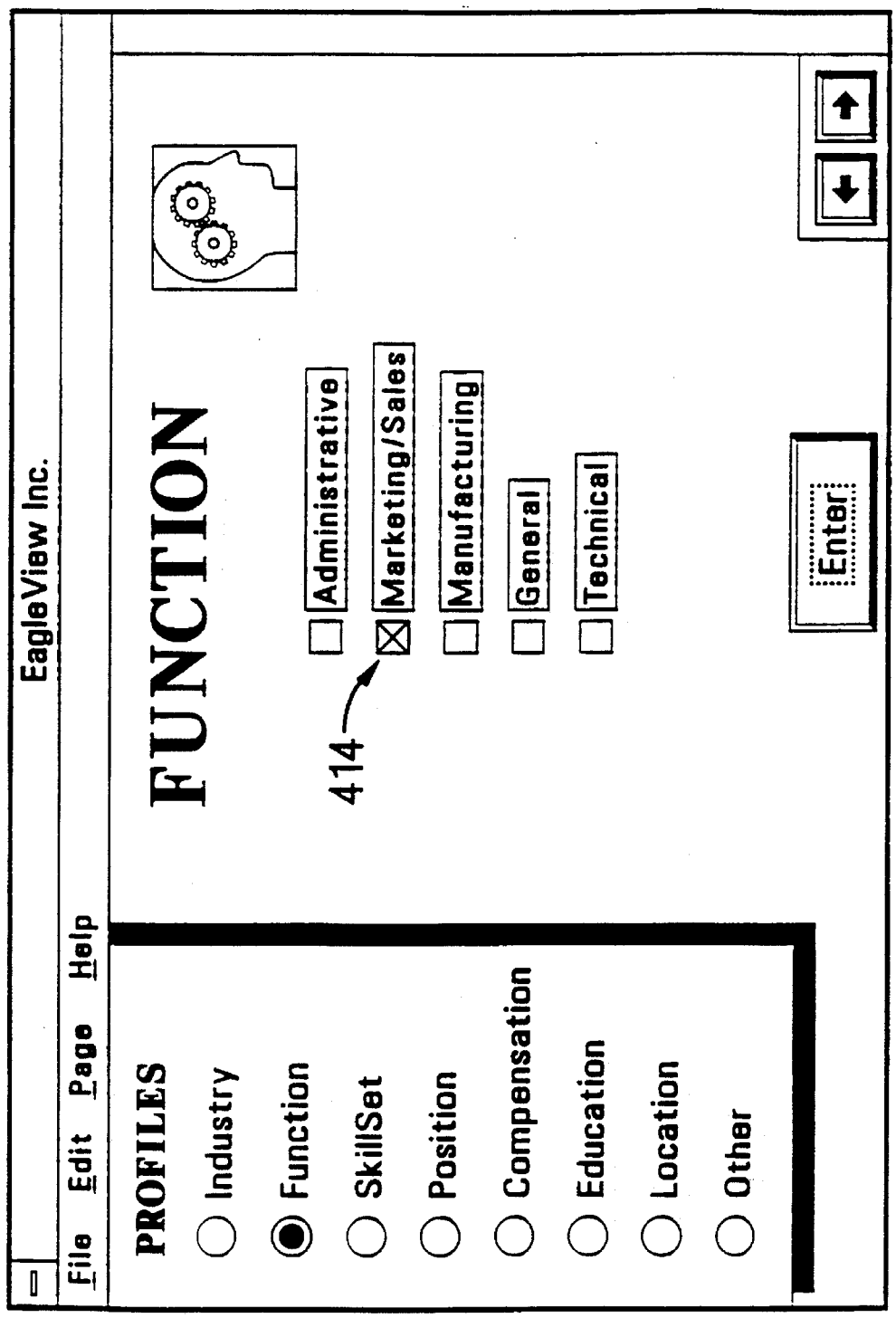
Figure 4F:
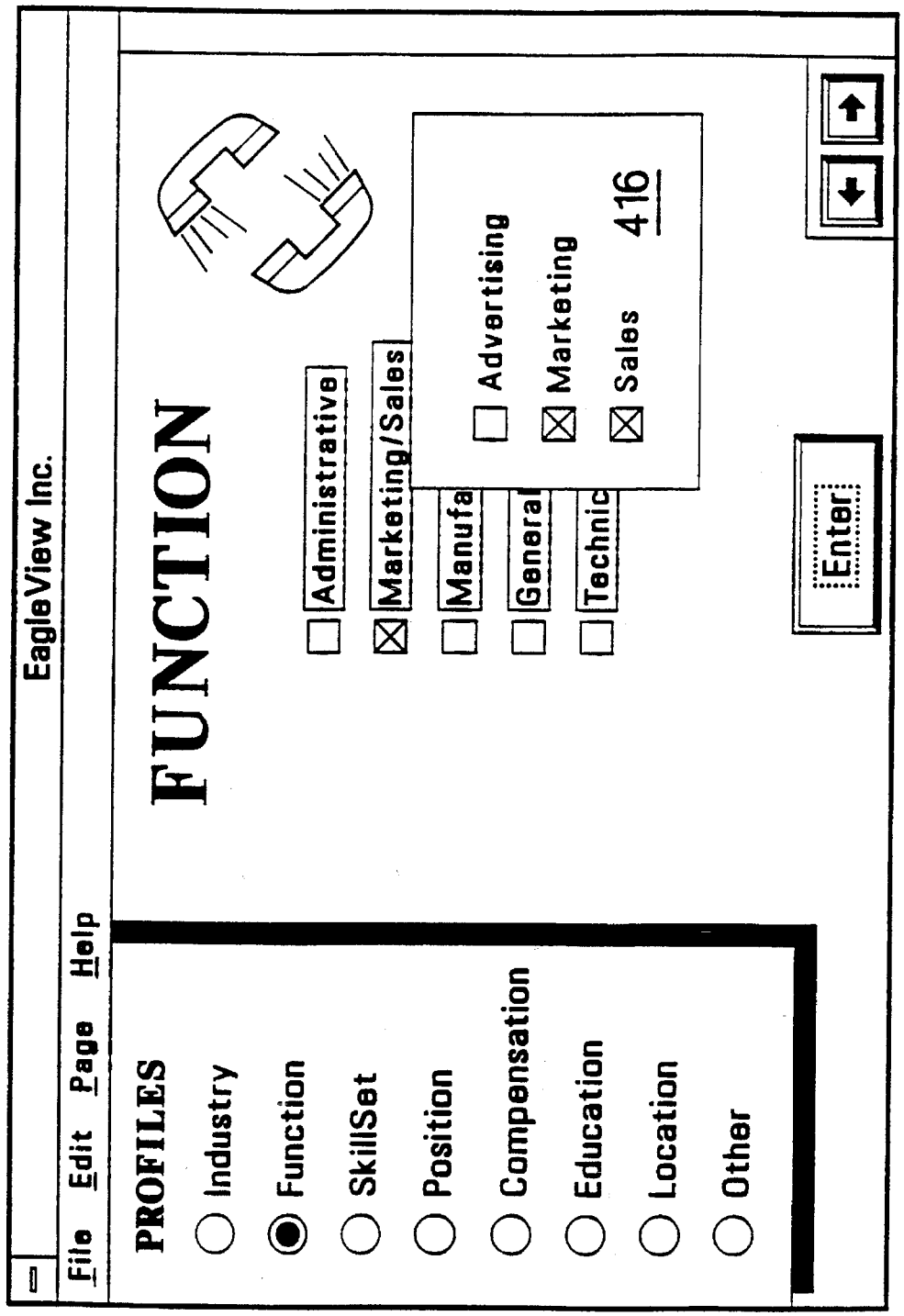
Figure 4G:
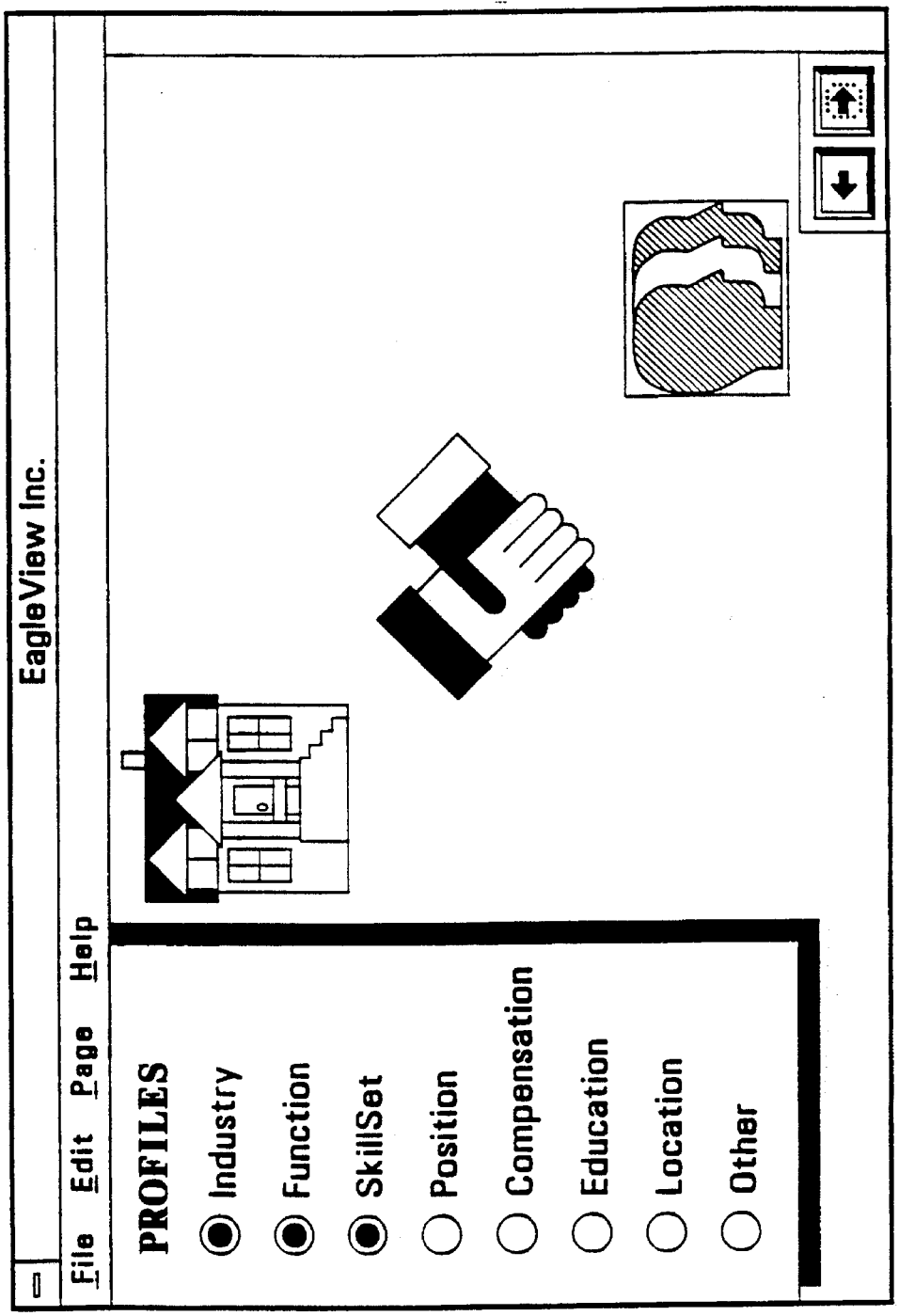
Figure 4H:
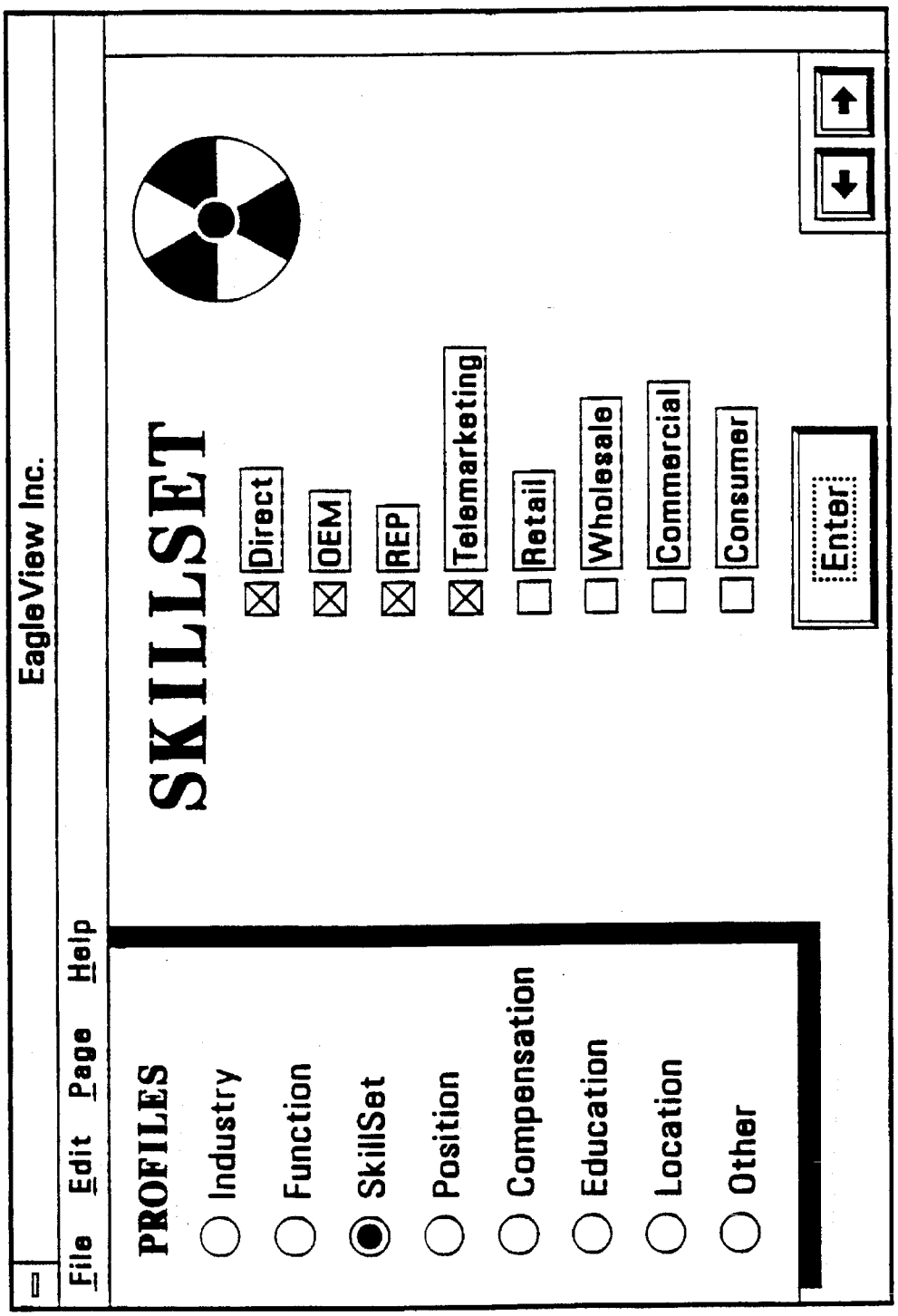
Figure 4I:
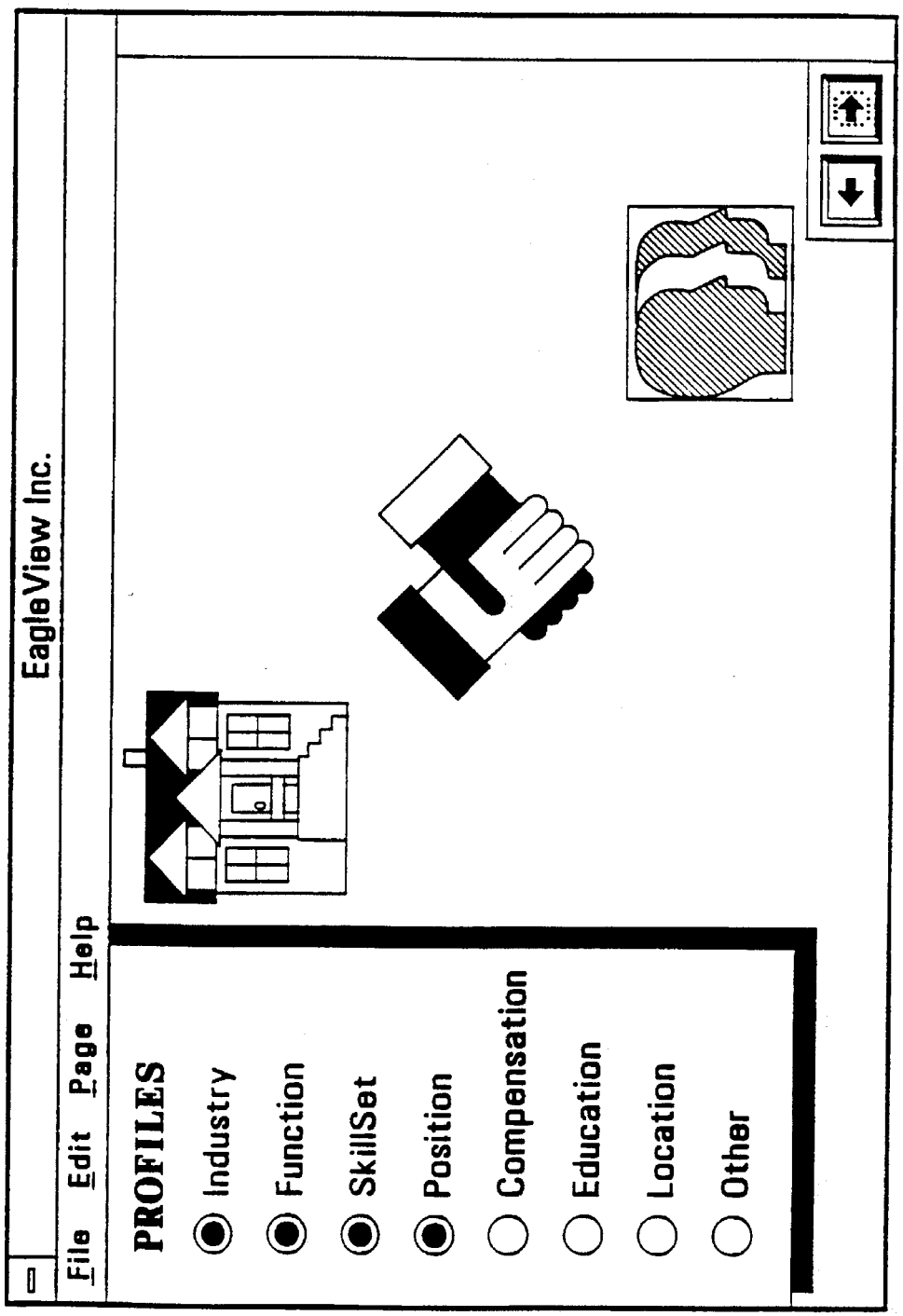
Figure 4J:
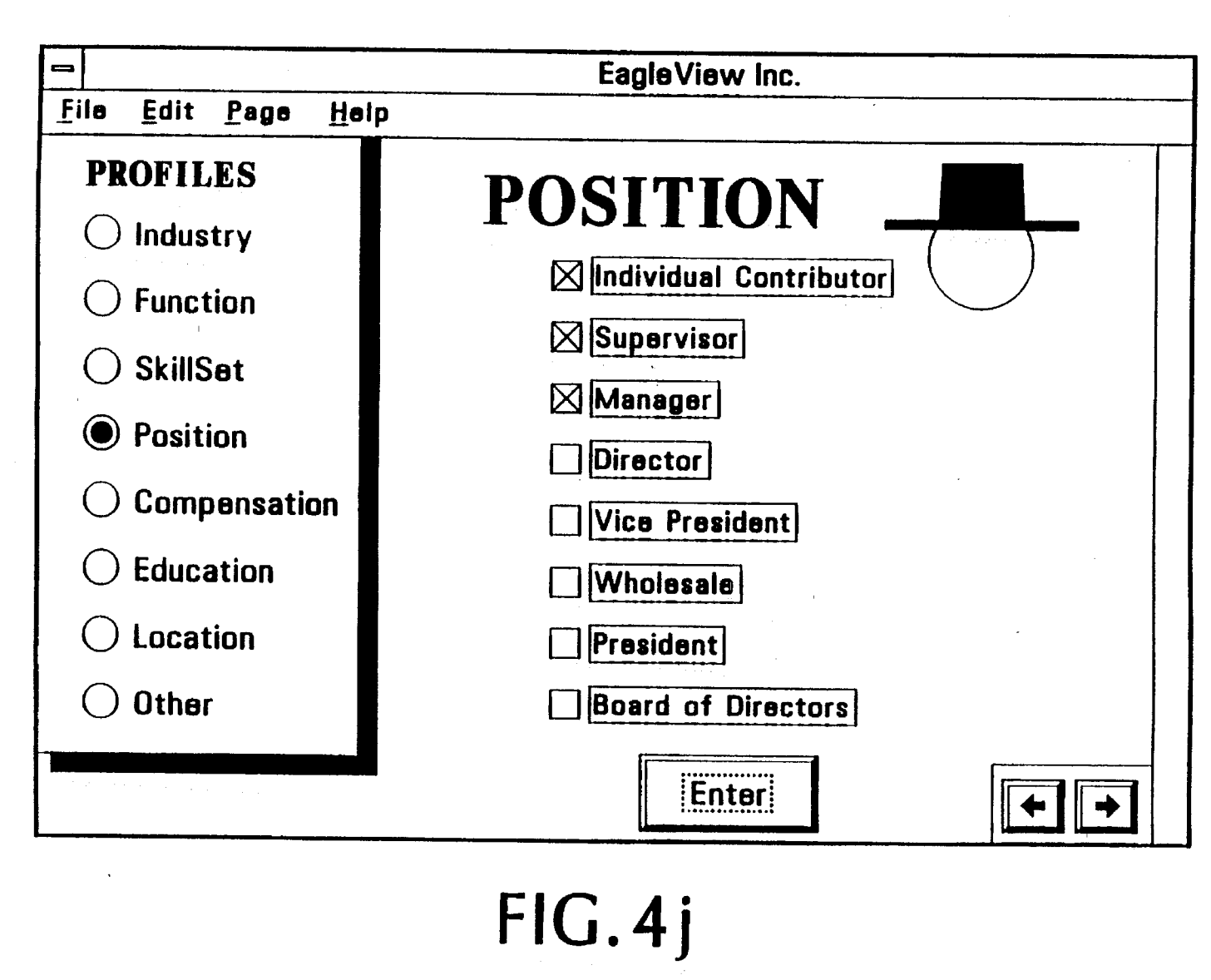
Figure 4K:
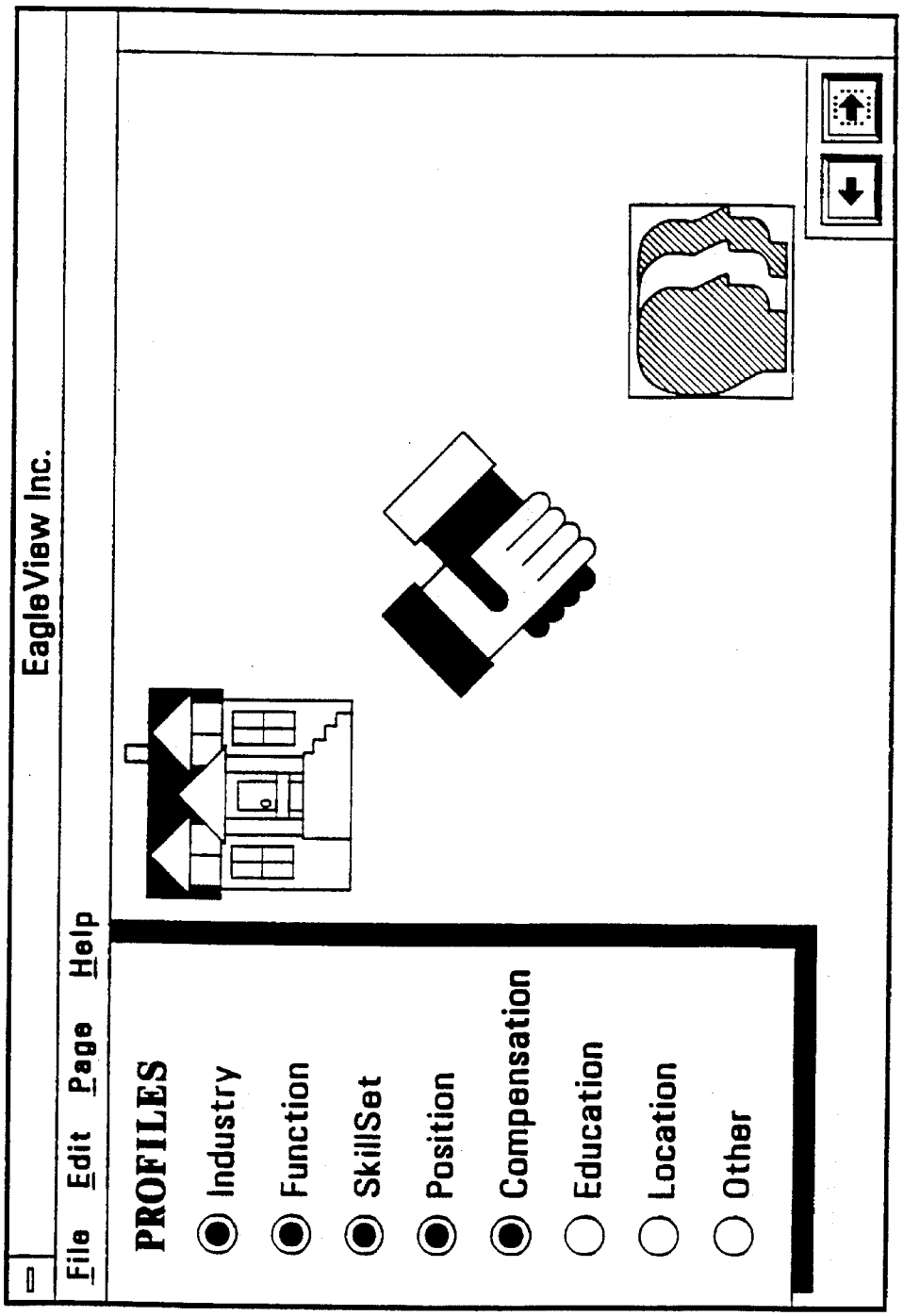
Figure 41:
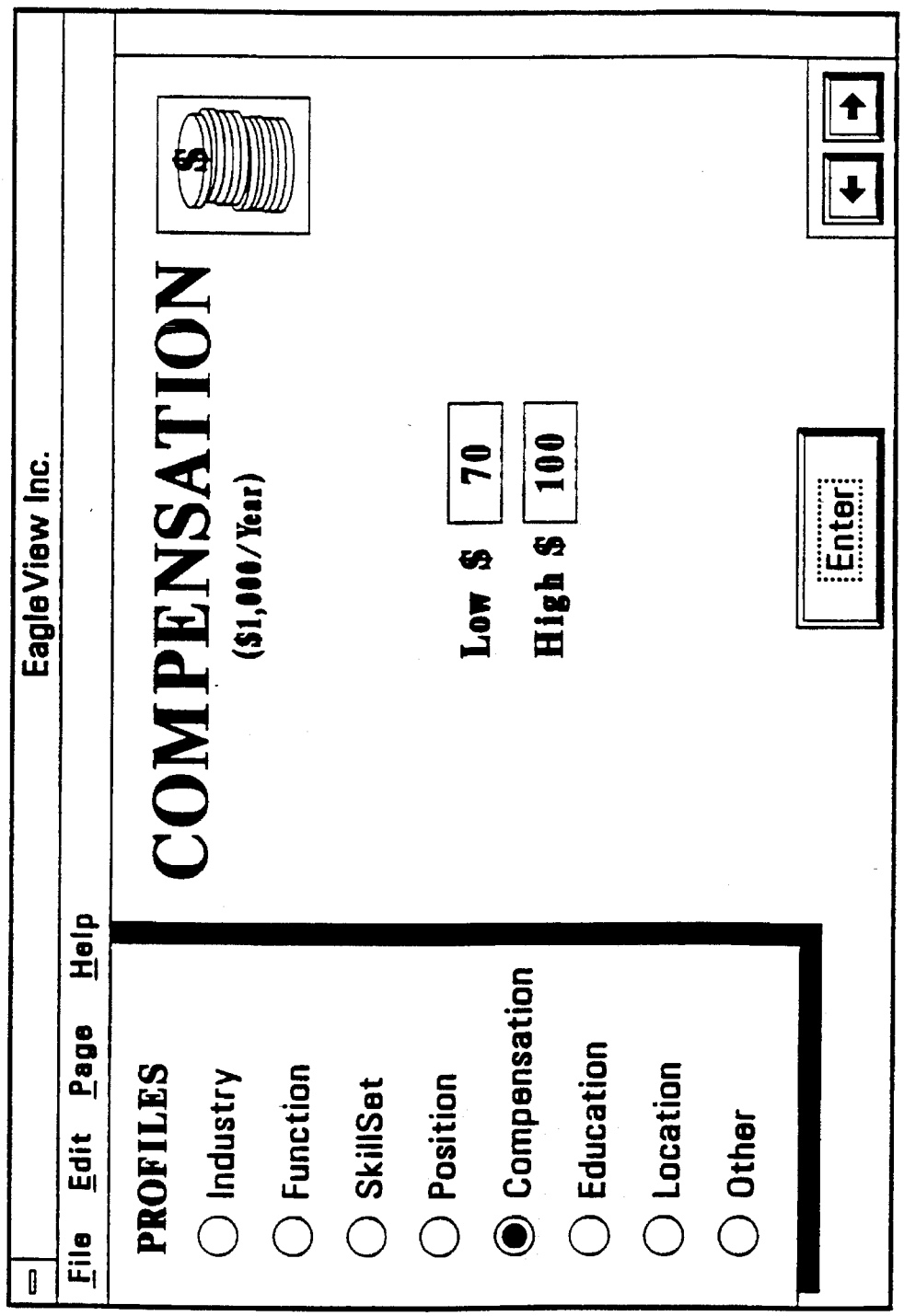
Figure 4M:
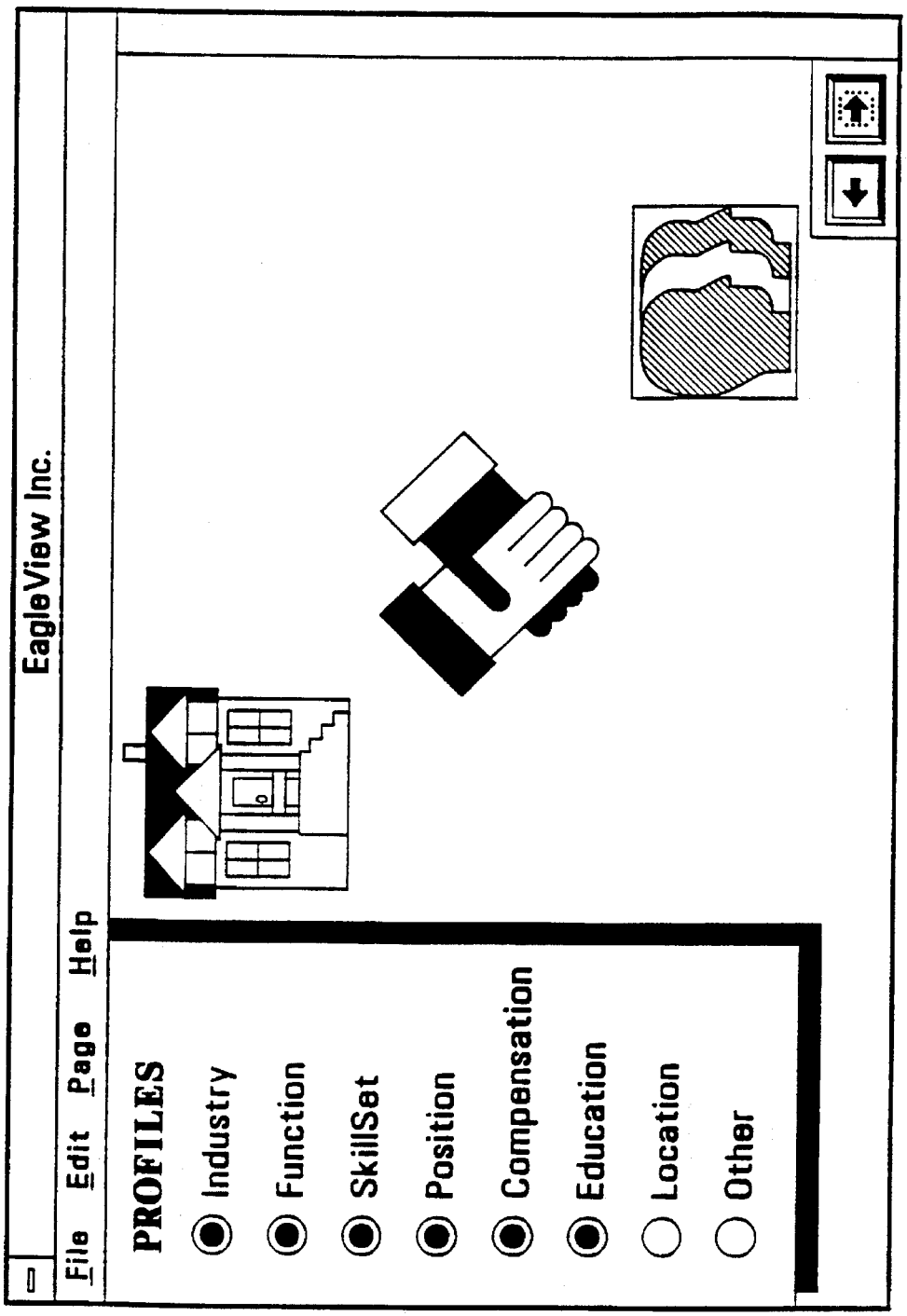
Figure 4N:
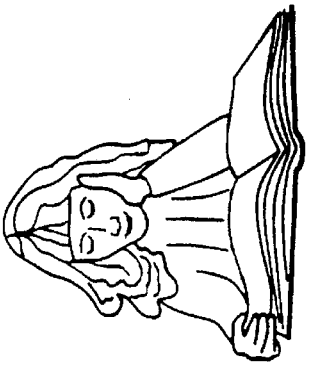
Figure 4O:
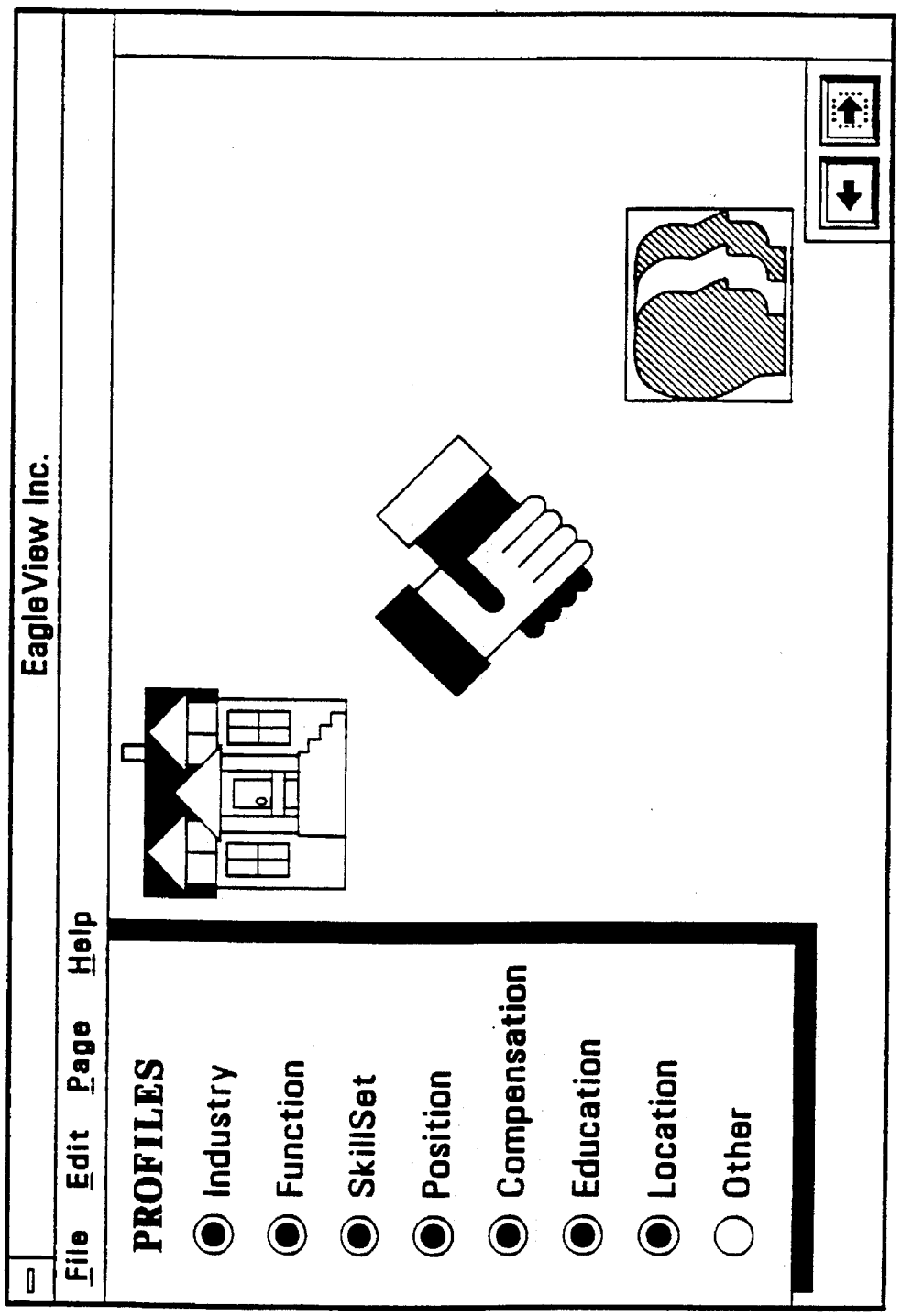
Figure 4P:
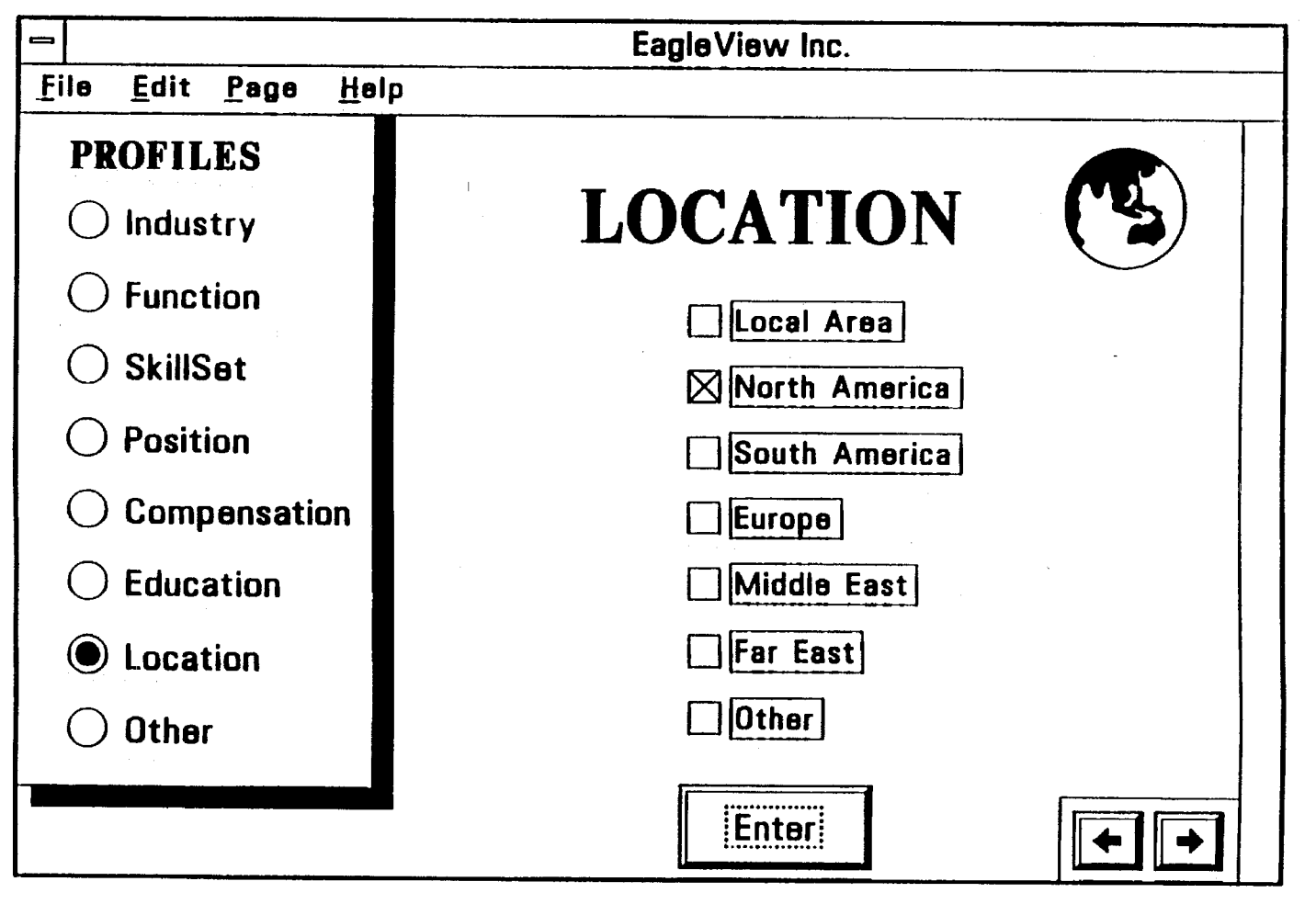

Referring to FIGS. 4a–4c, once a seller has chosen a specific category of information, for example, "Industry" 402 of FIG. 4a, the Seller's Interface presents levels of expanded characteristics for more-detailed selection, as shown in FIG. 4b. Pop-up menus may be used to allow additional choices, as shown in FIG. 4c. Similarly, FIGS. 4d–4f show another three-level choice of job function. In this case, the seller selects the "Function" 412 category in FIG. 4d, and then from among five sub-groupings: "Administrative" "Marketing/Sales" "Manufacturing", "General" and "Technical" in FIG. 4e. The choice of "Marketing/Sales" 414 causes Seller's Interface 300 to present "Advertising", "Marketing" and "Sales" as third-level choices. In this fashion the information of the Product Profile is gathered by the Seller's Interface into a highly-structured form suitable for database query by a buyer. Throughout the process the seller is presented with new choices only in response to his choices of higher-level criteria and is not presented with choices that are not significant to him.

FIGS. 4g–4q show further examples of hierarchical choices available to the Seller.

The Seller's Interface correlates entries by the seller to form the vectors of FIGS. 2d and 2e, for instance to form one vector indicating "Design experience in the Aerospace Industry" and another vector for the same product indicating "Production experience in Biotechnology."

Following the information capture by Seller's Interface 300, a new Product Profile is added to the Product Profile database 200. Multimedia information is stored in compressed form in the multimedia database. This may be in a variety of formats, e.g., JPEG, Group IV facsimile, MPEG or Indeo, to accommodate various presentation devices and network facilities.

The Buyer's Interface

Figure 5:
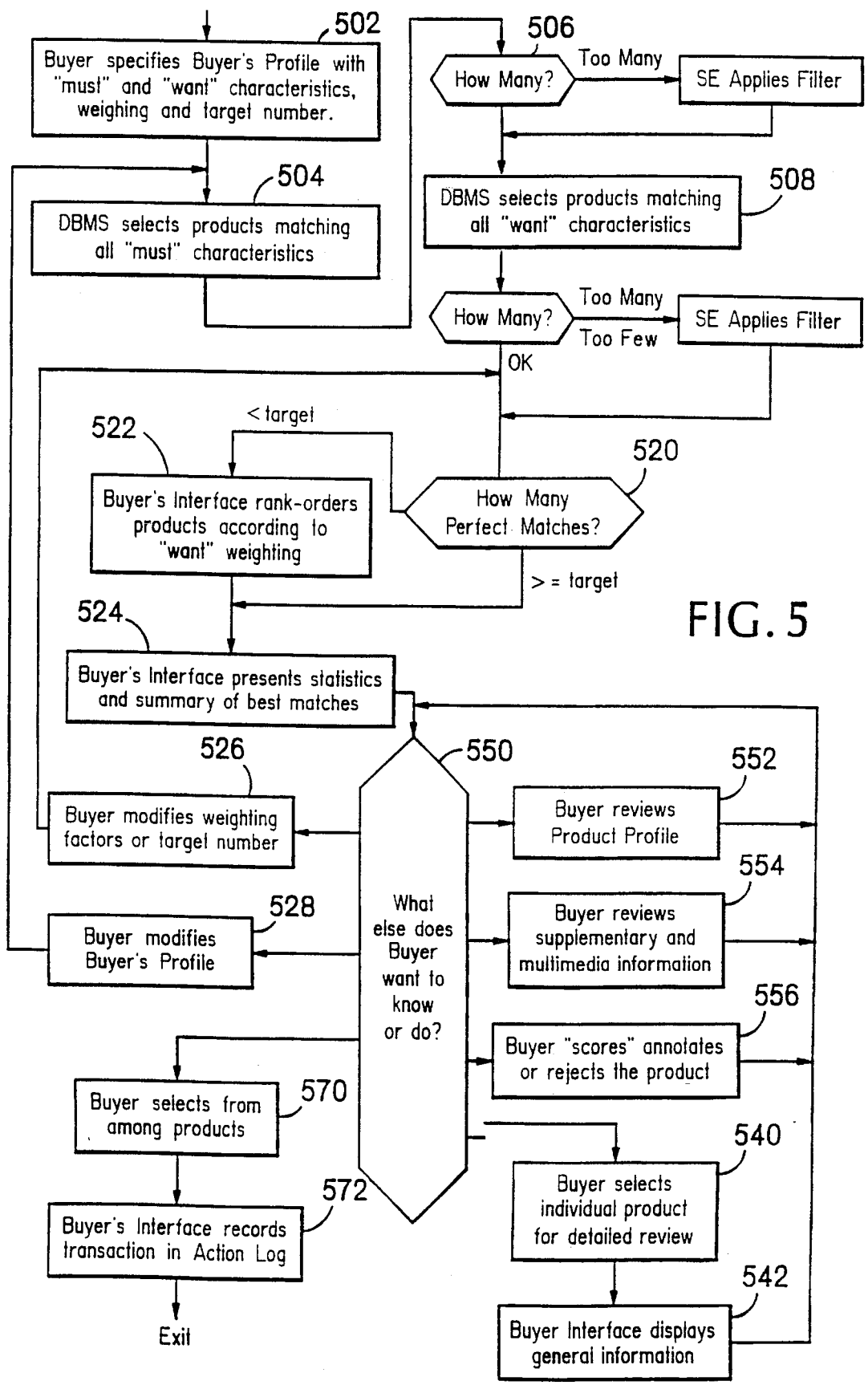
FIG. 5 is a flow-chart of the operation of the Buyer's Interface for the broker system of FIG. 1.

Referring to FIG. 5, Buyer's Interface assists the buyer in selecting the Product Profiles of interest from among all Product Profiles in database 200, and then in reviewing this "first cut" in more detail. The hiring manager, in the illustrated embodiment, is further assisted in scoring and otherwise comparing candidates. The automated process helps to reduce subjective and accidental biases.

Figure 4Q:
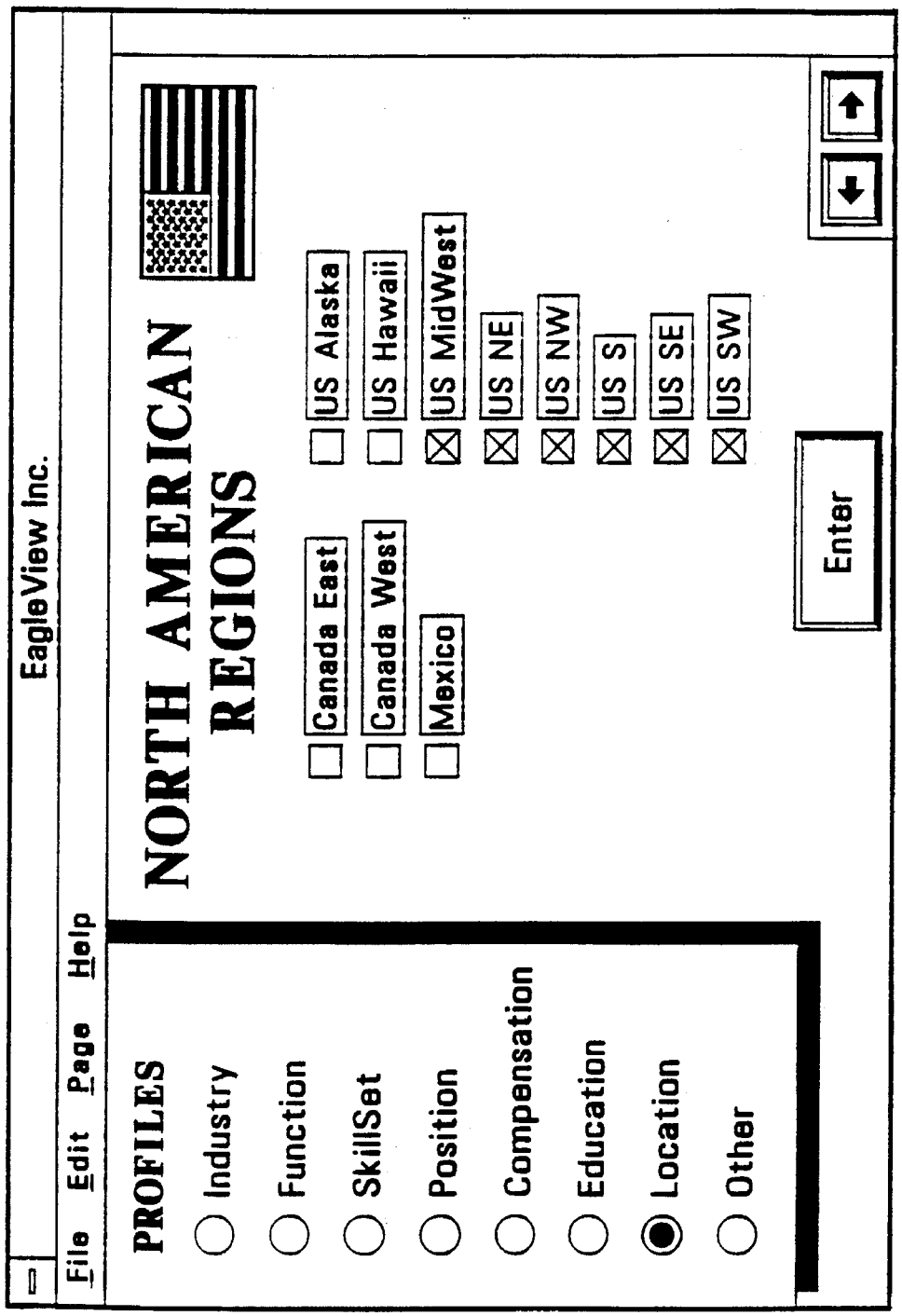

Upon establishing a search session, in step 502 the system presents the buyer with a series of screens, similar to those of FIGS. 4a–4q. The buyer, assisted by Buyer's Interface, specifies search criteria (the Buyer's Profile), indicating characteristics for selection or exclusion of products. To provide additional capability to the search, the buyer may specify "must have" criteria, weighted "want to have" criteria, and unstructured word associations (see discussion of FIGS. 7a–7d, below). The buyer may also specify a target number of "hits," that is, a target number of candidates whose profiles he would like to retrieve from the database for detailed review.

In step 504, the Buyer's Profile is transmitted to the database server 200. This transmission may either occur in a "batch mode" after the buyer has completed a full Buyer's Profile, or interactively as each sub-criterion is specified. The interactive mode enhances responsiveness because the database manager can begin its search with partial information. It also allows the buyer to tailor his search in response to the partial results retrieved from the database 200. In step 504, database server 200 retrieves database rows for all products that meet the "must" criteria. This step in the search selects from the total population of the database a workable set of products for further review.

If at least one product meets all the "must" criteria (step 506), in step 508 the database system and Selection Engine cooperate to select a set of Product Profiles that represent the close matches to the Buyer's Profile "want" characteristics. In step 508, the Selection Engine 580 and database manager 201 cooperate to select those products that match all "want" characteristics. If the number of hits meets or exceeds the buyer's target number, then the Buyer's Interface can proceed directly to step 524. (If the number of hits is very far away from the target, for instance if no products meet all "must" criteria or if a permissive Buyer's profile gives far too many hits, the Selection Engine may heuristically adjust the Buyer's Profile. This feature is discussed below, in connection with FIG. 6e).

But if too few products are perfect matches (meet all "musts" and "wants"), then in step 522 the Selection Engine selects all the products that meet the "must" criteria, and evaluates the selected products by summing the "want" weights of the characteristics that do match. The selected products are rank-ordered according to these sums of weights.

In step 524, the perfect matches from step 508 or the ordered "near misses" from step 522 are presented in summary form to the buyer.

In steps 526 and 528, the buyer may optionally modify the target number, the weighting factors for the "wants," or the "must" criteria to adjust the number of products selected from database 200.

In step 540, the Buyer's Interface presents product information in several levels of detail from the most-general to the most-specific to assist the buyer in selecting products for further review. See the discussion of FIGS. 7e and 7f, below, for further details. The buyer may also choose to modify the Buyer's Profile and thus the selected set of products (steps 526, 528) if the selected product set is too large, too small, or otherwise inappropriate.

In step 540, the buyer selects an individual product for review. Buyer's Interface 500 presents initial information on the selected product and indicates at step 542 whether additional information about the product is available, as discussed below in connection with FIGS. 7f–7i. The product's additional information may be viewed by scrolling windows, or selecting additional pages or associated multimedia information, by "point and click" on an icon. The navigation through the information provided is interactive, and information may be reviewed in any order and at the buyer's desired pace. It may be re-reviewed or, in some cases, saved for later perusal and comparison.

In step 550, the buyer may choose to review more detailed information for the selected product. From step 550, the buyer may select steps 552, 554, or 556 to obtain more information, or may loop back to steps 526, 528, or 540 to select a different candidate or set of candidates.

In step 552, the buyer may review the Profile Template information describing the selected product—a presentation of all the structured information on the product. Because this information is stored in structured form, it provides consistency and facilitates comparison between products.

At step 554, the buyer may also request to review multimedia or other data associated with the product. For example, in the personnel application, these would include the candidate's or references' answers to particular questions, a scanned image of a resume, a representative piece of work, or a presentation. Text information may also be searched to explore areas not included in the structured information of the database tables of FIGS. 2a–2d.

At step 556 of the illustrated embodiment, upon completion of the review of an individual product, the buyer chooses to record his impressions and decisions. The Buyer's Interface accepts "scoring" information, further actions and other annotations to assist in ranking products and also, for example, for communication within teams of buyers. Reasons for elimination of a product from further consideration can also be recorded. This phase is discussed in more detail in connection with FIGS. 7j–7m, below.

The buyer can navigate among steps 552, 554, 556, 526, 528, and 540 described above: re-examining information, changing the Buyer's Profile, or comparing products.

If a selection of a product is made (step 570), a complete Action Log of the session is stored within the database (step 572). This will allow subsequent analysis, feedback to the seller and tracking of the buyer's actions and buying criteria. This is important in the personnel application, for example to show conformance to employment regulations. It can also allow the seller/candidate to modify his presentation or identify desired training or other improvement needs.

Note that the flow chart of FIG. 5 shows interaction with a single buyer. A team of buyers may each perform the buying session described in FIG. 5, simultaneously if desired, and the Buyer's Interface will assist in correlating the impressions of each member of the team, as discussed in more detail in connection with FIGS. 7j–7m, below.

A more-detailed consideration of the screen displays of the Buyer's Interface and the buyer's interactions follows.

Referring to FIGS. 6a–6d, the Buyer's Interface presents an opening greeting. In box 612, the buyer identifies himself and gives a name to the session 614 (either a new name, or the name of a previous session to resume). Sessions might be named for a position or requisition number. Security information is also entered to validate the session.

Referring again to FIGS. 4a–4q, the buyer enters Buyer's Profile search criteria with more-detailed choices following selection from among broader choices, using screens similar to those with which the seller entered a Product Profile.

Referring to FIG. 6e, the conditions specified by a buyer at step 502 or 528 of FIG. 5 are not limited to a simple AND conjunction of one industry, one function, one skill, etc. He may specify "and" or "or" conjunctions between his criteria, and may specify some as "must" and others as "wants." The "wants" can be weighted relative to each other. For instance, the buyer may want a person with marketing or sales experience in the electrical subsystems or semiconductor devices industries (for instance, because the position's requirements are not specific to one industry). The buyer can specify these complex conjunction rules graphically. For instance, in FIG. 4c, the buyer has clicked two industry rules: "Subassemblies/Electrical Subsystems" and "Subassemblies/Semiconductor Devices." In FIG. 4f, the buyer has clicked both "Marketing" and "Sales." In FIG. 4h, the buyer has clicked on "Direct," "OEM," "Rep.," and "Telemarketing."

Still referring to FIG. 6e, the buyer can also note that some criteria are "musts" and some are "wants." After going through all screens of FIGS. 4a–4q, a summary screen is displayed showing all criteria of the Buyer's Profile. All selected characteristics are initially "wants" with weight 10. Characteristics can be made "musts" by clicking on the "M" button 660. When a characteristic is selected as a "must," the associated "must" button is highlighted, as shown for "Function."

A product is required to match all "musts" in the Buyer's Profile to be selected. For instance, if multiple characteristics are made "musts" in a category, a Product Profile will only match the Buyer Profile if the Product Profile has all characteristics (for instance, as described in the experience vectors of the tables of FIGS. 2d–2f). If two nested characteristics within a category (for instance, "Telemarketing Sales" is nested within "Marketing/Sales" within category "Function") are both made "musts," then the database search can ignore the broader characteristic and select only on the narrower.

Note that "must" characteristics have no numeric weight.

The weight 662 of a "want" can be raised or lowered by clicking on arrows 664. If multiple characteristics are selected in a single category (for instance "Electrical Subsystems" and "Semiconductor Devices" as discussed above), weights can be individually assigned to each characteristic by scrolling the selected characteristics of the category with scroll arrows 666 and adjusting the weight to be associated with each of the characteristics.

A selected characteristic can be assigned a weight of zero, for instance as shown in "Location" 668. This has the same effect as if the characteristic is assigned the lowest possible weight. If some characteristics in a category are given zero weights and others given non-zero weights, then those with non-zero weights will be given preference over those with zero weights.

Combination characteristics can be specified in the combination box 670. Characteristics are selected for combinations by clicking on the characteristic selection boxes 672 (using scroll arrows 666 to display the characteristics of a category) and pasting selected characteristics into combination box 670. In the example of FIG. 6e, a combination has been defined calling for "Marketing/Sales" with "Subassemblies." The combination has been given a high weight of twenty. Note that in the "Function" box, "Marketing/Sales" has been made a "must." The industry selection, subassemblies, has been given a low weight of five. By using these features, a very flexible selection structure can be configured. The terms of a combination are ANDed together if the buyer selects "EVERY" 674 or ORed together if the buyer selects "ANY" 676. Combinations, may be selected and combined into further combinations, and given weights or be made "musts." The product will be given the weight score of the combination if all characteristics of the combination match, or a zero score if any of the elements of the combination fail to match. The product will remain unselected if it fails to match any characteristic in a "must" combination.

It may be desirable or necessary that either the buyer or the Selection Engine treat the selected characteristics of one or more categories as "musts" so that the number of database hits in step 504 is smaller than the entire database. If the buyer specifies no "must" characteristics, then the Selection Engine can use one of several heuristics to adjust the Buyer's Profile to reduce the number of hits to a workable number. Complements of these same heuristics can be used to convert "musts" to "wants" if there are too few hits.

For instance, if electrical subsystems is preferred but semiconductor devices is acceptable, the buyer might assign "Electrical Subsystems" a weight of eighty, and "Semiconductor Devices" a weight of seventy-six. These weightings will allow the database manager 201 in step 504 to gets hits for candidates with no experience in these industries, but it will cause the ordering of step 522 to assign candidates matching these characteristics a high ranking that "swamps out" all other lower ranking (and hence lower weighted) "wants." If the buyer limits the number of categories with large-weighted characteristics, this will have the effect of picking a pool of candidates with experiences matching at least one characteristic in each of the categories given large weights. Note that "musts" have the effect of ANDing together the selected characteristics; large weights in a category have the effect or ORing together the large-weighted characteristics. The Selection Engine may incorporate special logic to recognize when large weights have been assigned to the selected characteristics of a category, and to internally treat the weighted selections as a "must" for the category when generating the SQL select statement. This has the advantage of reducing the number of database hits in step 504.

A second heuristic forms a union of intersections of characteristics. For instance, if the buyer has specified a "must" on a characteristic from category A and "wants" on characteristics from four other categories B, C, D, and E, the Selection Engine may, when generating an SQL SELECT, treat this Buyer's profile as one that matches all but one of the wants: "A and ((B and C and D) or (B and C and E) or (B and D and E) or (C and D and E))." If this results in too few hits, the Selection Engine may try again with another SELECT that specifies two of the four want categories: "A and ((B and (C or D or E)) or (C and (D or E)) or (D and E))." If there are still to few hits, the Selection Engine may try again with a still-broader match criterion, or give up and report what it found to the user.

In a third heuristic, a Buyer's Profile could be broadened by substituting broader characteristics for narrower ones. For instance, if the Buyer's Profile specifies "Subassemblies/Semiconductor Devices," the Selection Engine may substitute the broader characteristic "Subassemblies." Or, the database system may have tables telling which characteristics are near-synonyms. In cases where the database query generates too few hits, the Selection Engine may request from these tables near-substitutes for the Buyer's Profile characteristics, and thus automatically generate a broader database query.

A fourth filtering method may be combined with or used instead of the three heuristics. For instance, if one of the heuristics gets too many hits, this filtering method may be used to pare down the number of products presented to the buyer. If a heuristic method gets too few hits, the Selection Engine and Database Manager may try again with a looser match criterion, and use the filter. In the filter, each product selected by the "musts" of the Buyer's Profile (if there are no "musts," all products will be selected) is evaluated against the weighted characteristics of the Buyer's Profile, with the product given a "score" equal to the sum of the weights of the matching characteristics, or the number of "want" characteristics matched. A buffer equal to the target size, or possibly somewhat larger, is maintained in sorted order. Each product is scored; if the score is better than the score of the product at the bottom of the buffer, then that bottom product is dropped from the buffer, and the newly-scored product is inserted into the buffer at the appropriate point.

Figure 7A:
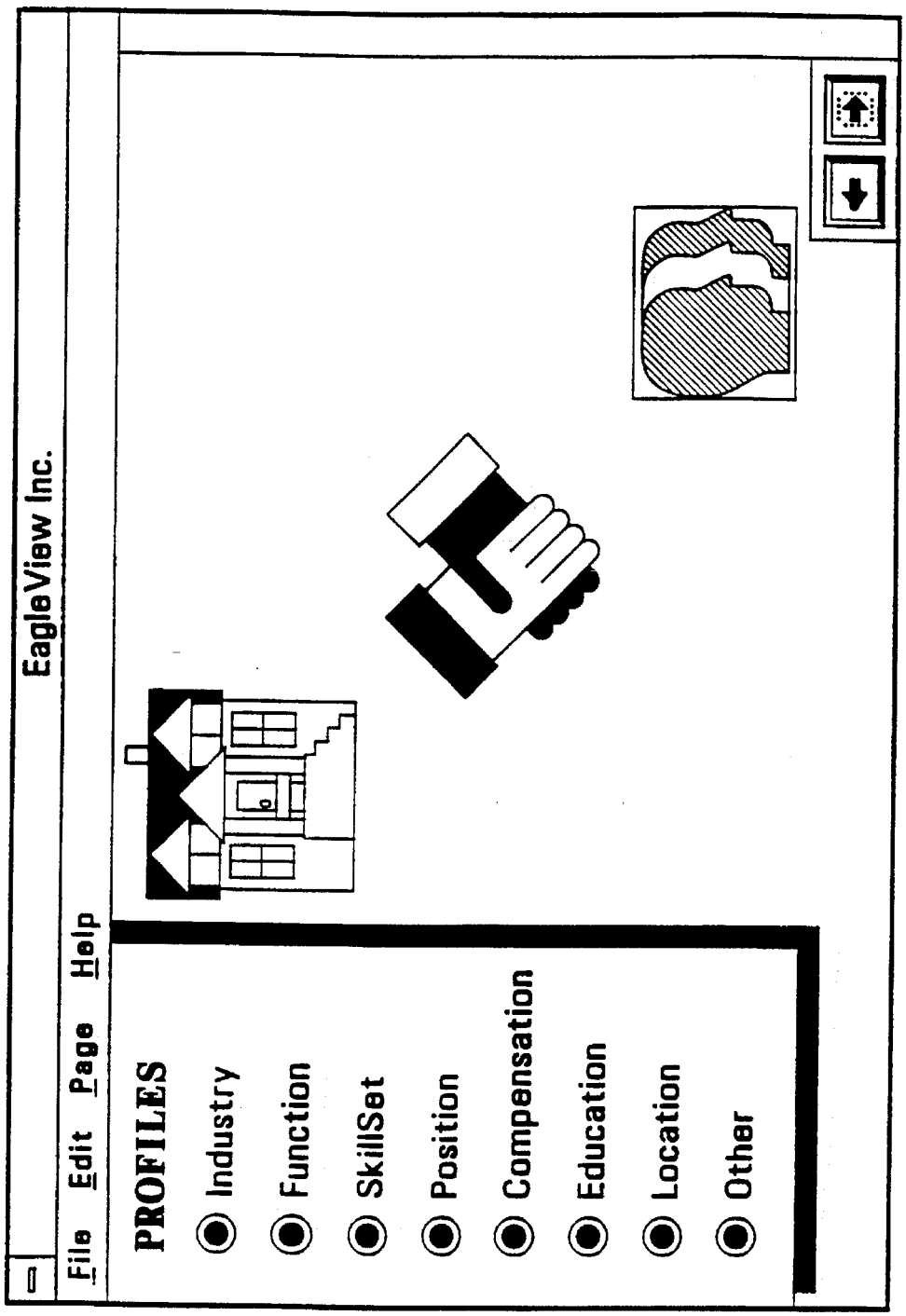
Figure 7B:
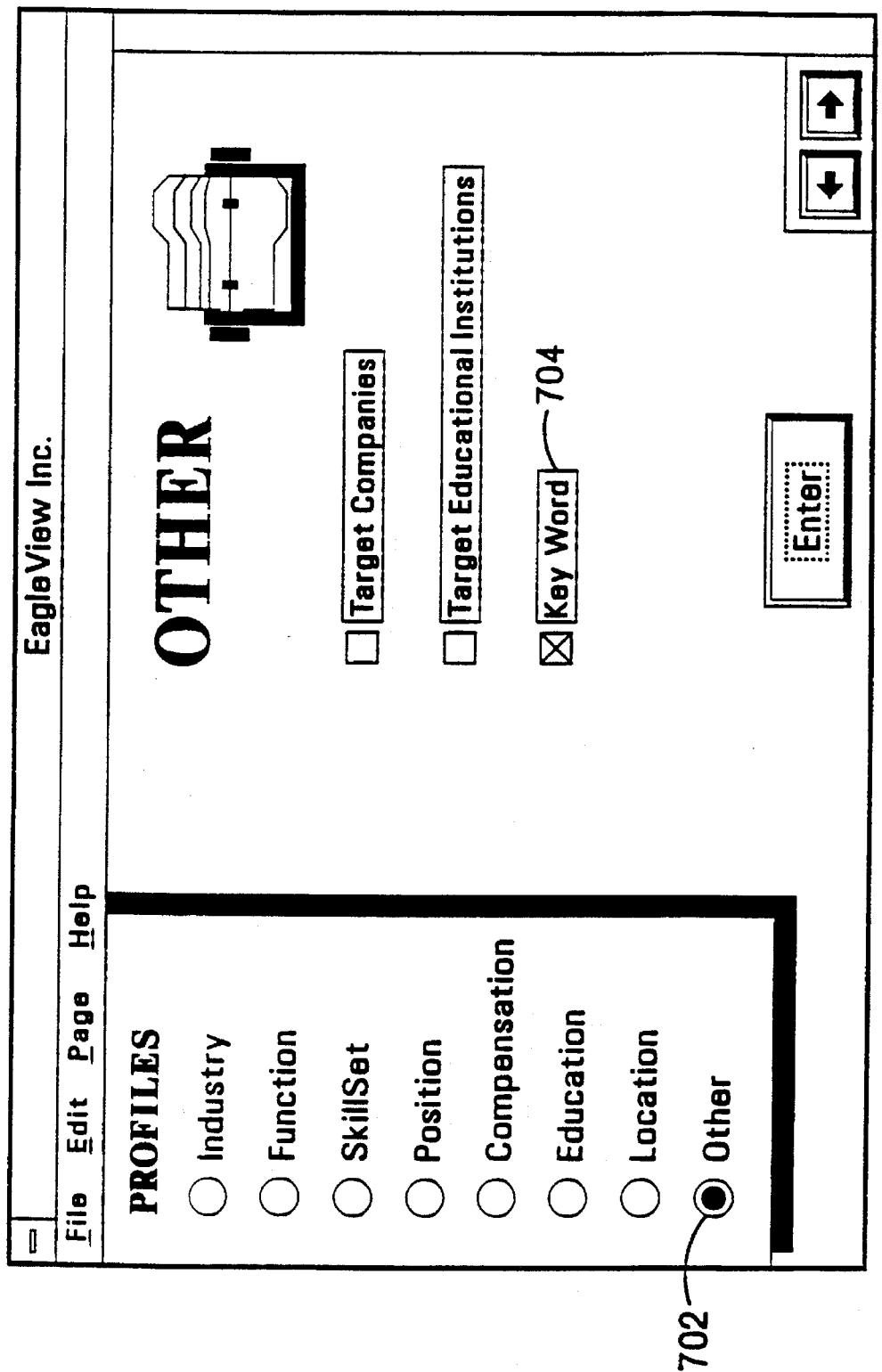

Referring to FIGS. 7a and 7b, the buyer may select an "other" category 702 of selection criteria. This choice presents a list of optional entries presented in a scrolled list format. The buyer can thus choose from less frequent entries. Since these same selections have been presented to the seller in creating the Product Profile, accurate matches are possible. For instance, a buyer may choose a "Location" using a combination of a button followed by selection of, for example, a metropolitan statistical area from a scrolled list. FIG. 7b shows choosing specific characteristics such as companies, educational institutions, or a keyword 704. This allows searching for keywords in text data associated with a product, for instance in a resume.

Figure 7C:
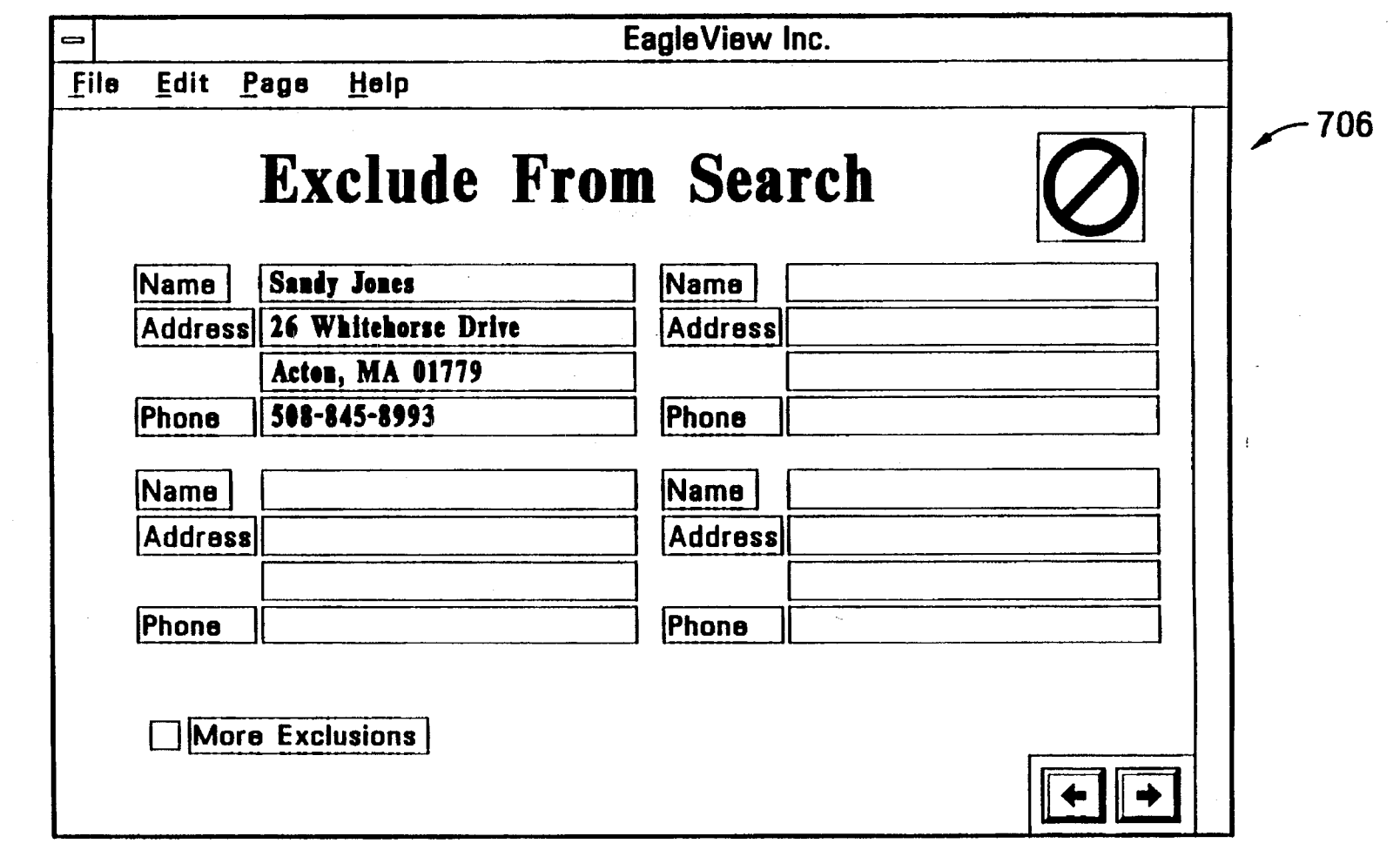

Referring to FIG. 7c, when the Buyer's Profile is complete, the buyer may define specific "exclusion criteria" 706 for products known not to be of interest, for instance individual candidates or employees of specific companies.

Figure 7D:
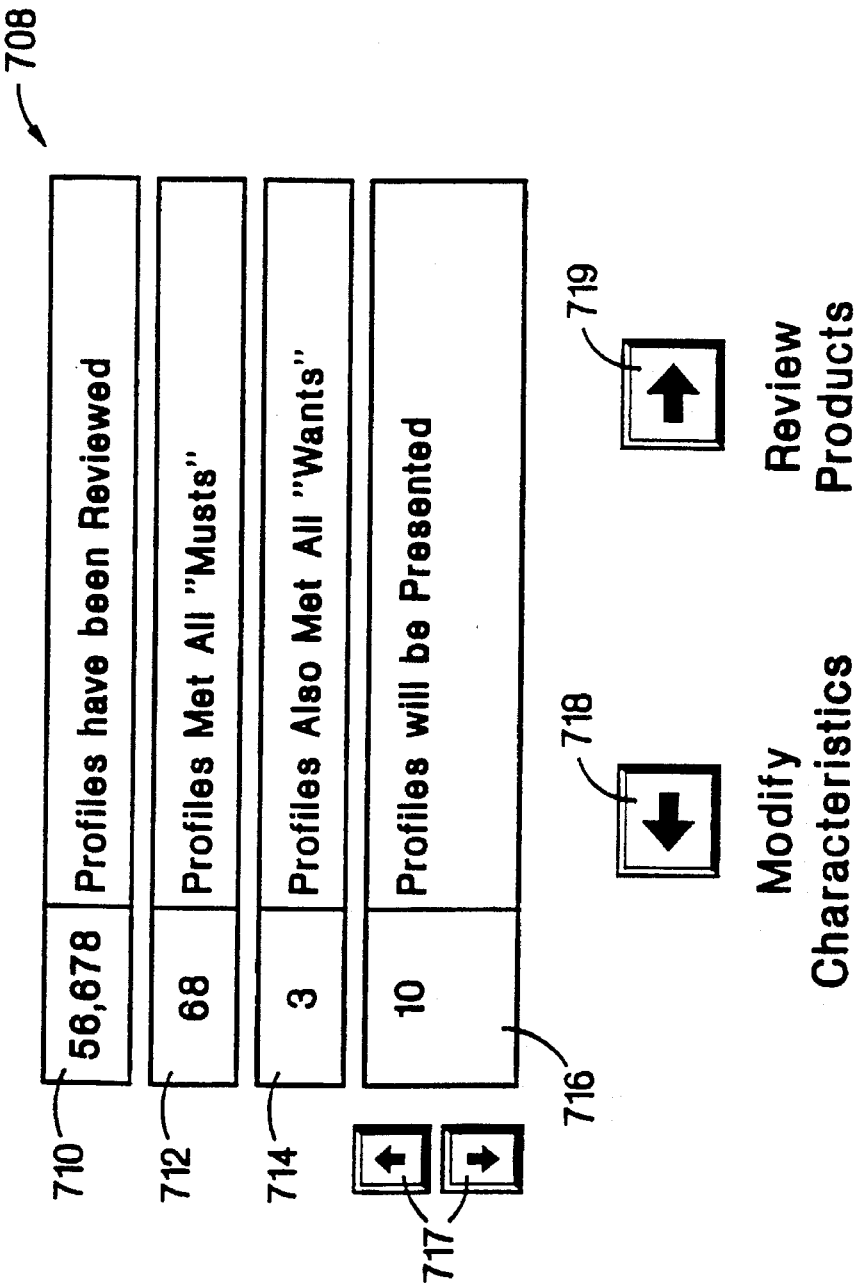

Referring to FIG. 7d, after the database query of steps 504 and 508, in step 524 the Buyer's Interface presents a summary 708 of the database hits. The summary lists the total number 710 of Product Profiles reviewed, the number 712 that met all "must" criteria, and of those, the number 714 that also met all "wants." The target number 716 of profiles to present is also displayed, with arrows 717 to raise or lower this number. From this screen, the user can either click on button 718 to modify the characteristics of the Buyer's Profile (steps 526 or 528 of FIG. 5), or may click on button 719 to proceed to review the specific products found by the search (step 540). For instance, if the target were ten, and twenty products met all "musts" and "wants," the buyer may want to raise the target to twenty.

Figure 7E:
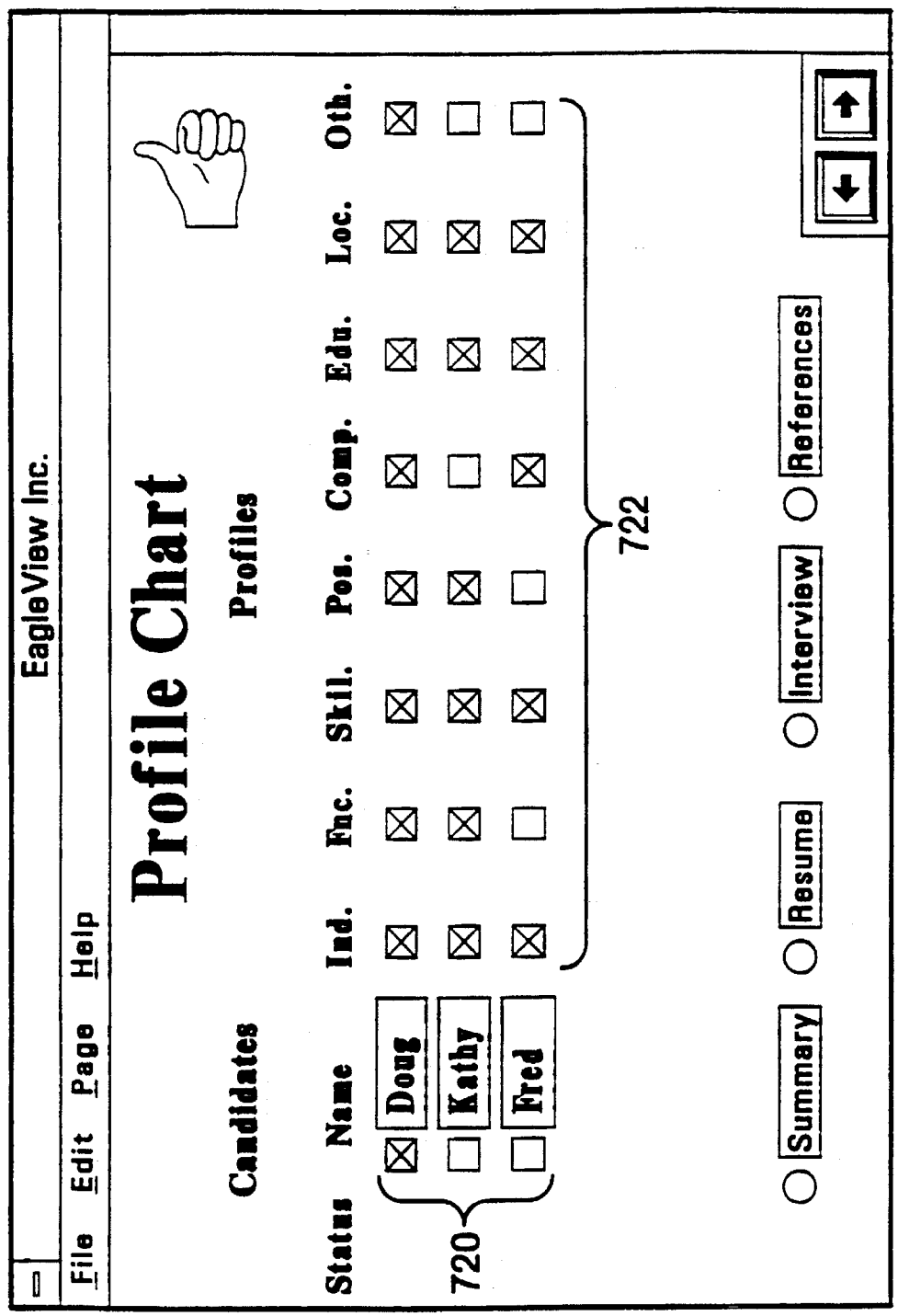

Referring to FIG. 7e, the database management system matches the Buyer's Profile against the Product Profile database 200 to select those products that have the highest correlation to the buyer's choices. The Buyer's Interface displays those products 720 with the close matches, along with the matching characteristics 722.

Figure 7F:
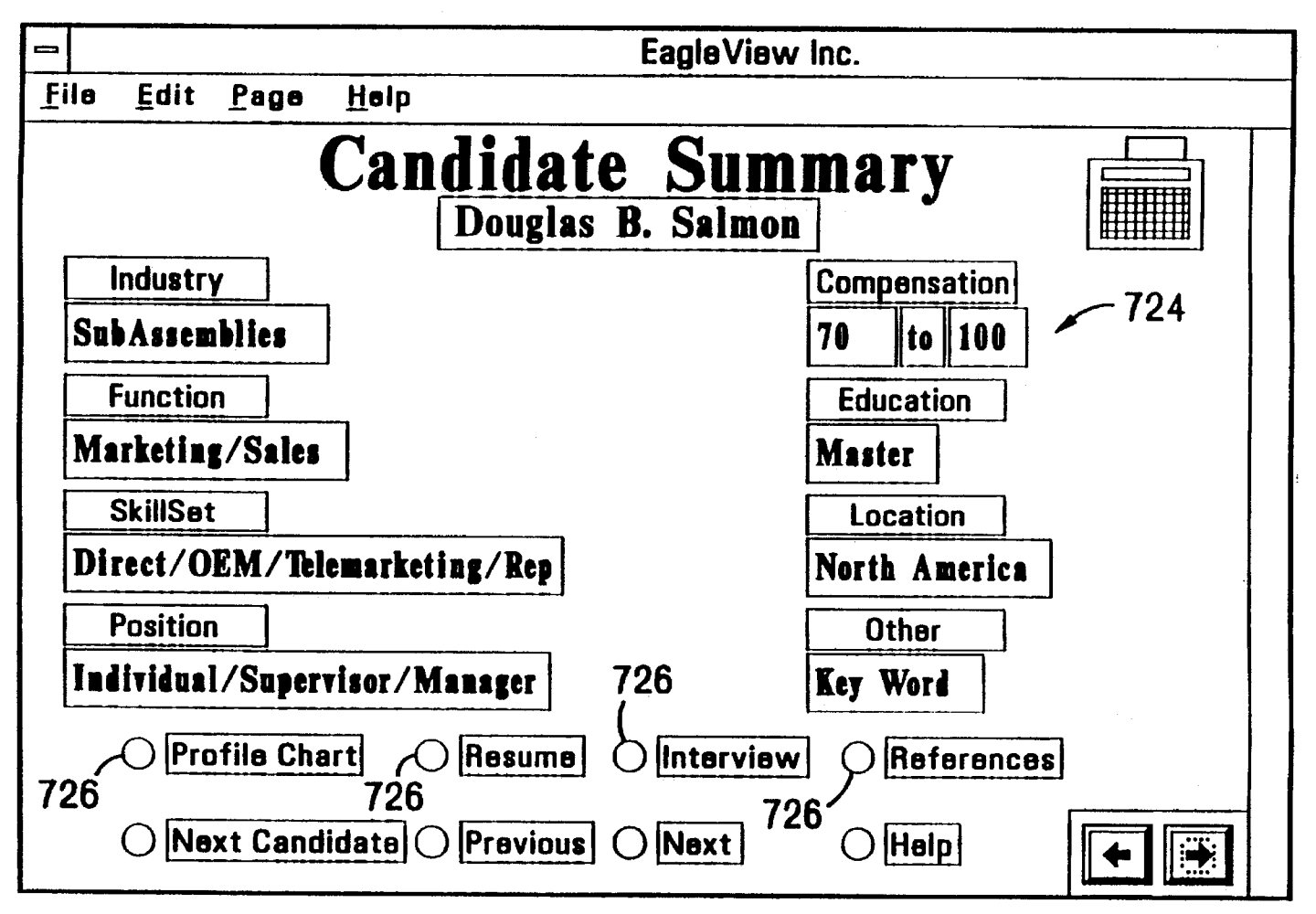
Figure 7G:
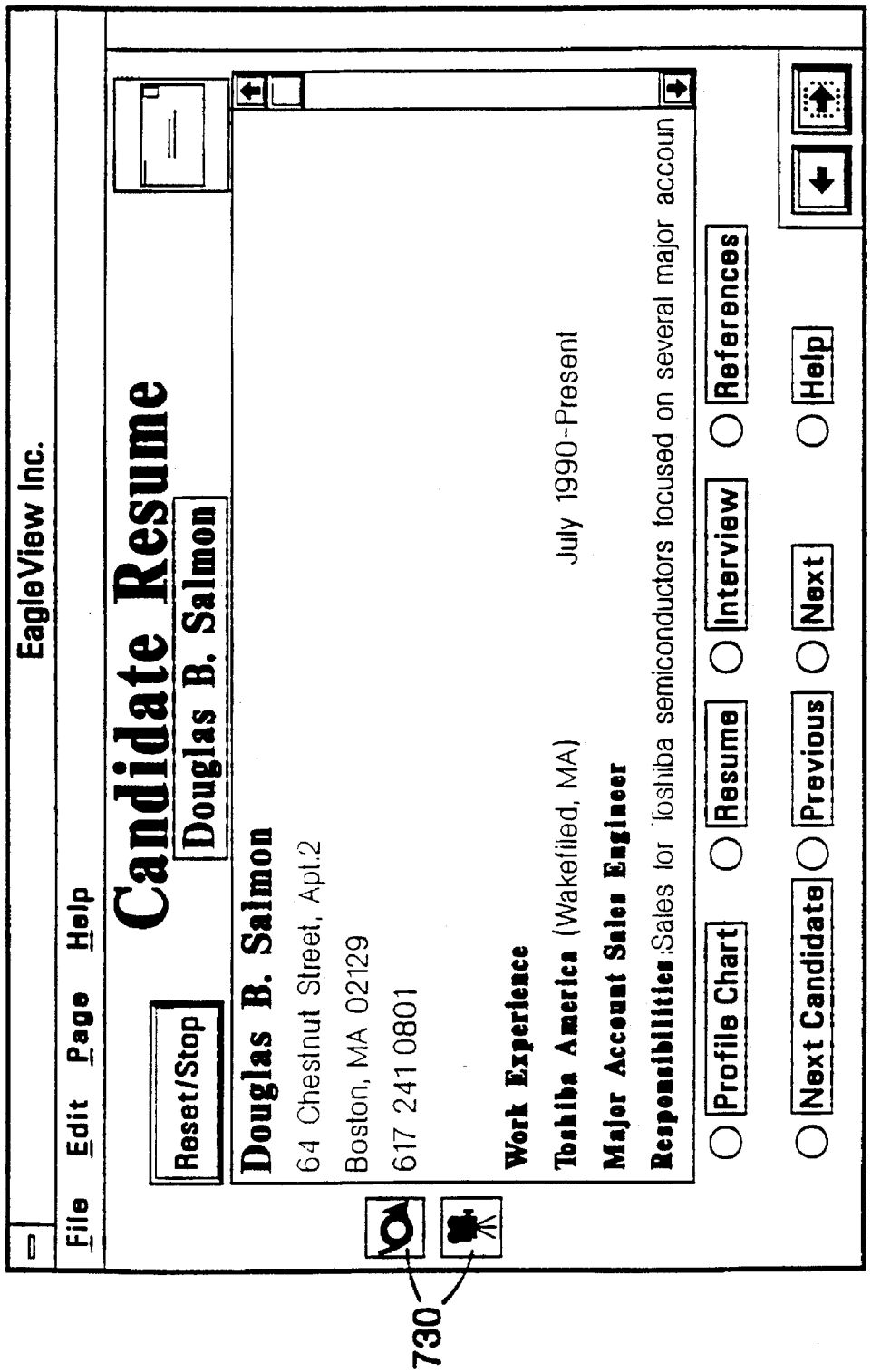

Referring to FIG. 7f, the buyer now gives the products closer examination. The Buyer's Interface shows the Product Profile information 724 on chosen candidates, and indicates whether additional information is associated with the candidate's Product Profile. The buyer can display this additional information, including multimedia information, by clicking on buttons 726. For instance, FIG. 7g shows a scanned image of the candidate's resume. This image may be read, printed or annotated by the buyer. Icons 730 on the screen indicate the presence of multimedia information that can be reviewed.

Figure 7I:
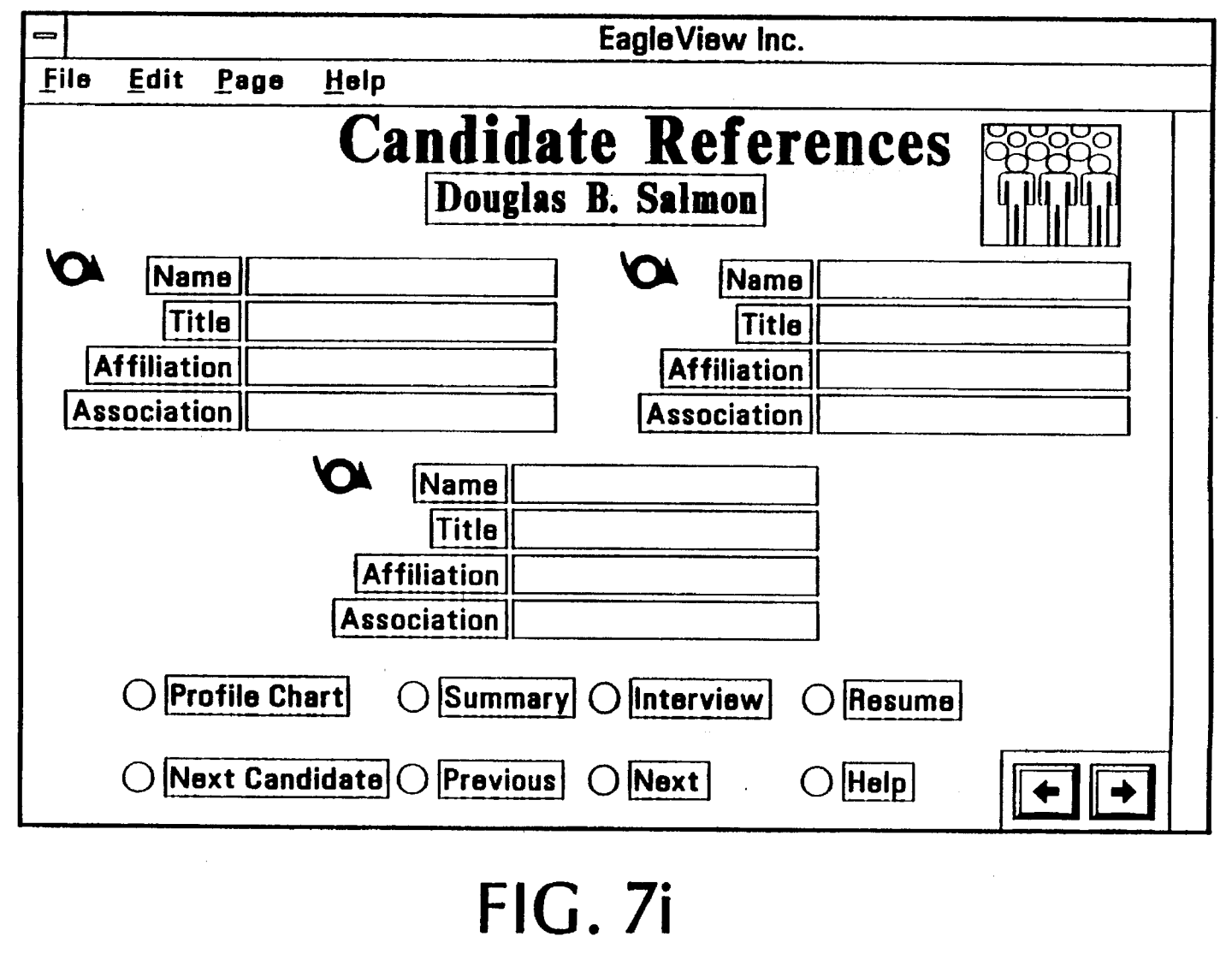

Referring to FIG. 7h, the Buyer's Interface displays the candidate's video or audio clips by title 222. Each clip has two associated buttons, for instance 731 for video or 732 for audio, which indicates the presence and nature of a clip. With these buttons, the buyer selects specific clips for presentation. Icons 730 cause the presentation of the selected clips to proceed. Such prerecorded interviews provide all buyers with a common view of a variety of information on each candidate. FIG. 7i allows a buyer to review information provided by references for the candidate (or product testimonials).

The displays and mode of multimedia presentation generated in 7f–7i may be tailored to the bandwidth of the communications link between the seller and the database 100, such as voice and text for low-bandwidth telephone connections or store-and-forward, or moderate-quality video over ISDN, or real time full-motion, thirty-frame-per-second video over ATM or Ethernet cable.

Figure 7J:
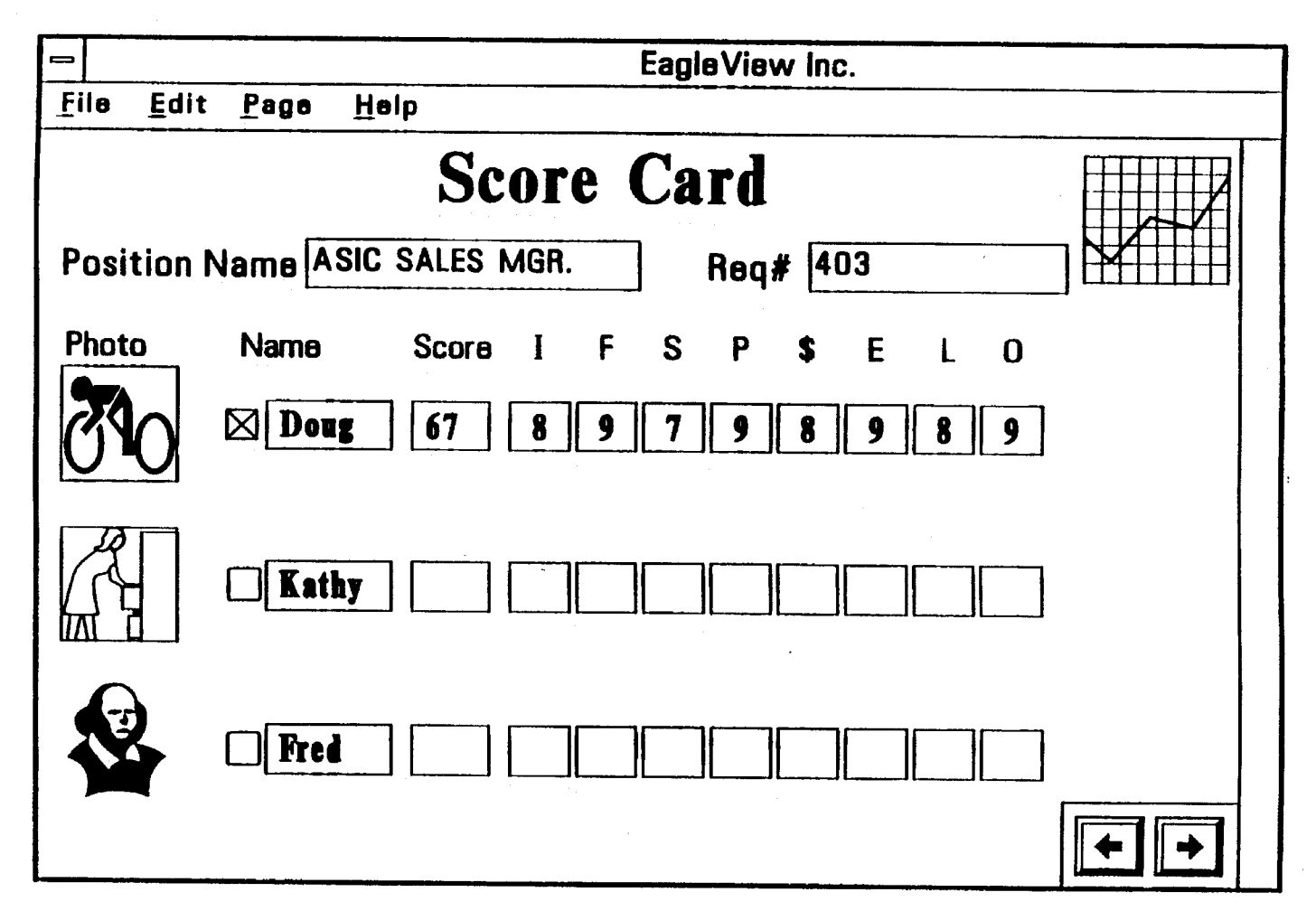
Figure 7K:
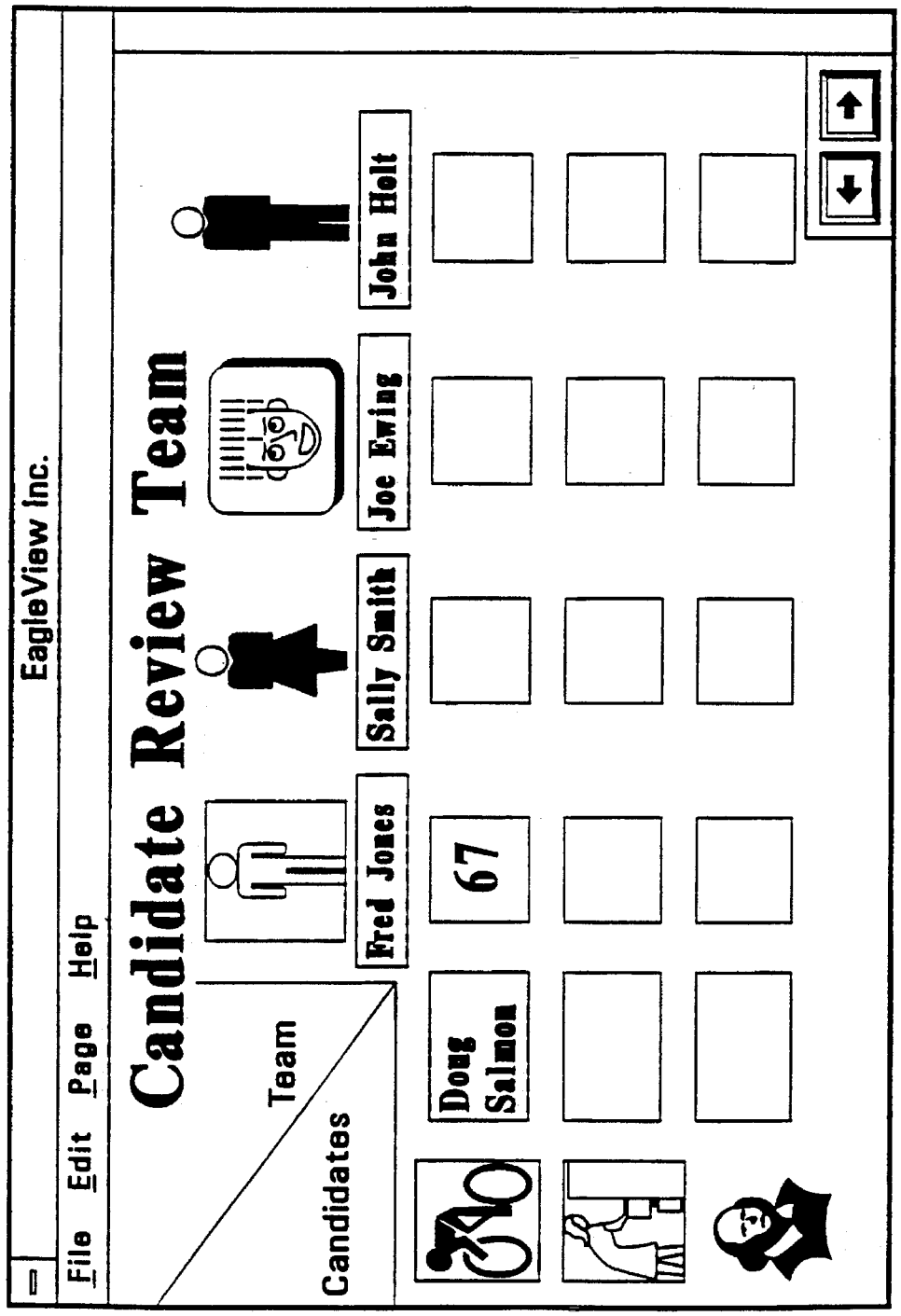
Figure 71:
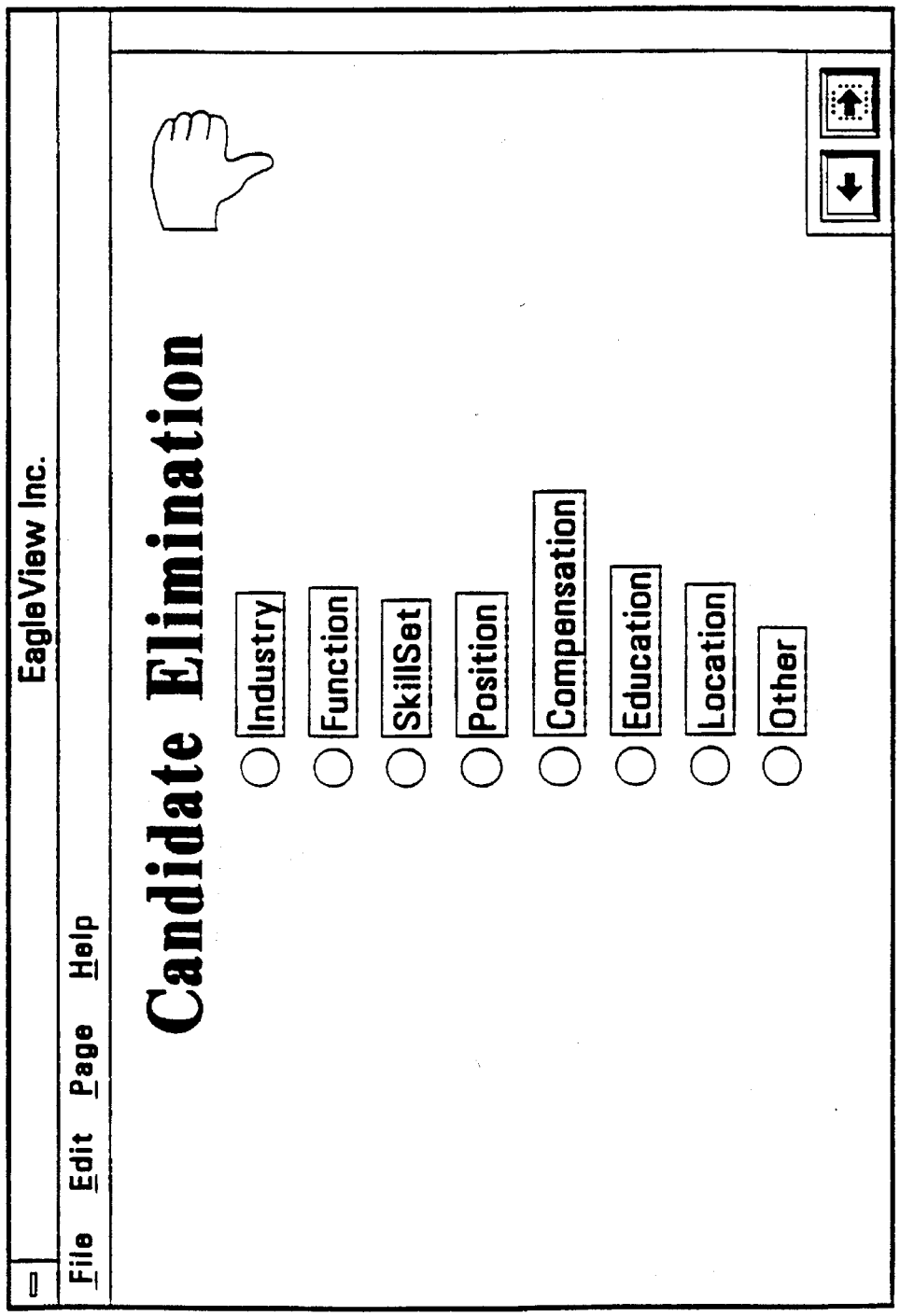

Referring to FIG. 7j, the illustrated Buyer's Interface 500 allows the buyer to score the selected candidates. The buyer places a numerical score on each characteristic of the Product Profile. An overall score for each product is calculated according to weighting factors provided by the buyer (equal weights in the example). This score is made part of the Action Log that can be retrieved and compared with that of other buyers in a team selection process. The uniform presentation of information to all team members facilitates team evaluation. FIG. 7k shows a high level view of this information provided for a team's use in comparing selections. Another aspect of the process is shown in FIG. 7l:

candidate rejections are captured with the buyer's reasons. This information is recorded in the Action Log for later review or tracking of the process.

Figure 7M:
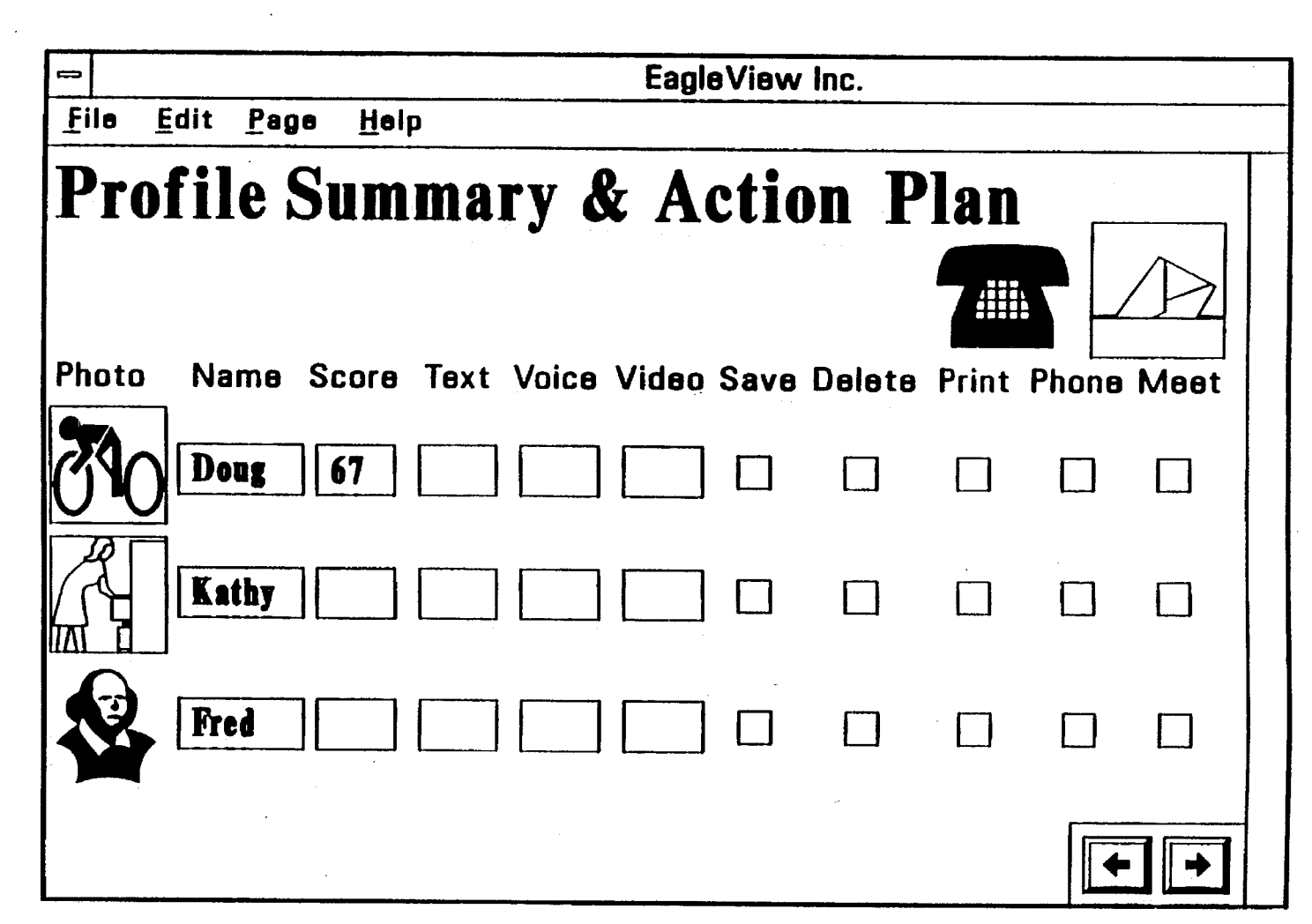

FIG. 7m shows another feature of the Buyer's Interface, a follow-up "memo pad" recording future actions to be taken with each candidate. In most cases, the decision process will be completed by personal interviews of a small number of appropriate candidates. The Action Log is used to record future actions, relate them to past decisions and coordinate them among the team.

Figure 7N:
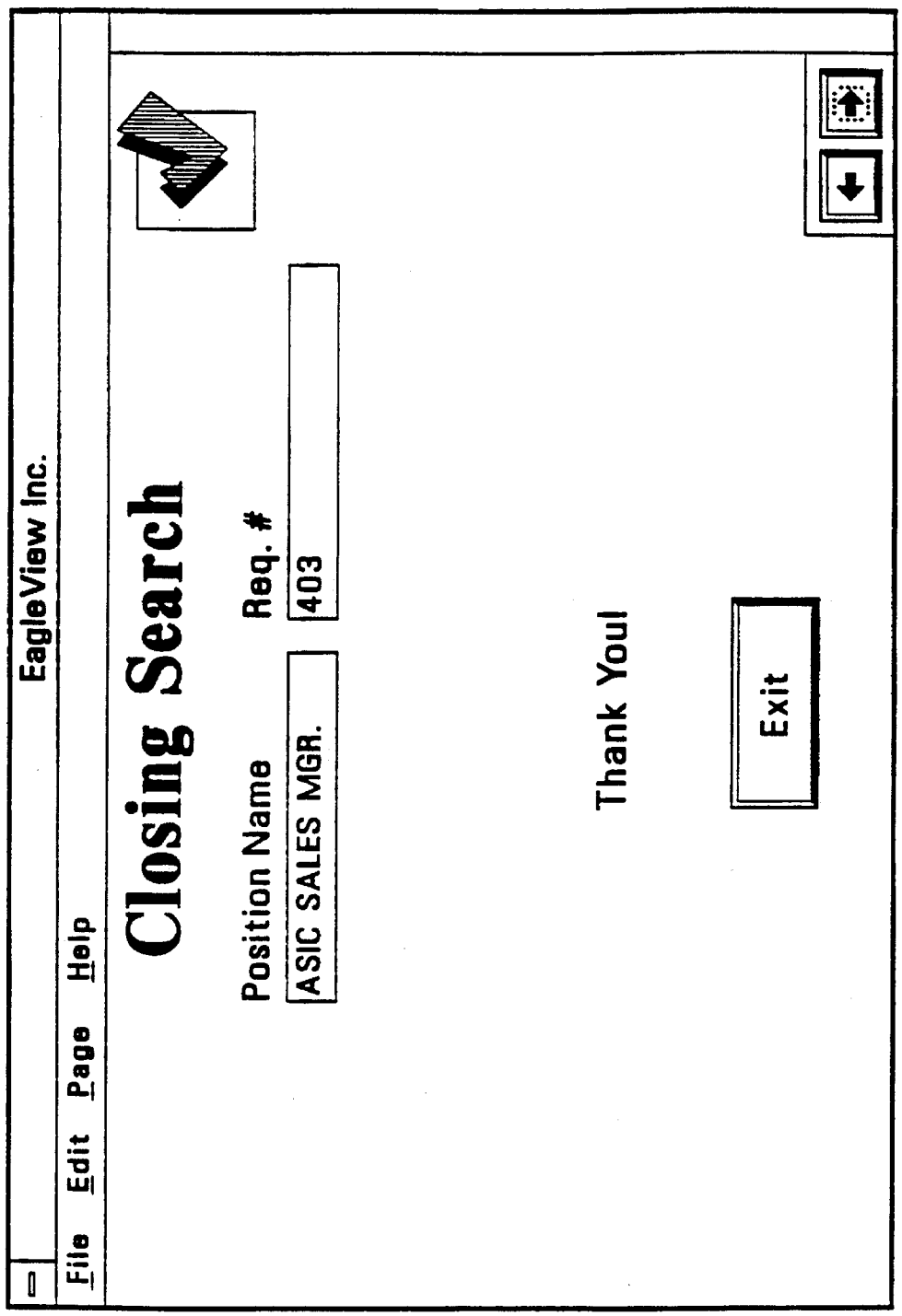

FIG. 7n is used to close the search session and identify the session for future reference.

The Action Log

The Action Log contains a record of the significant Buyer's Interface actions selected by a buyer. The Action Log records each product reviewed, the buyer's scoring decisions, and reasons for any rejection. This information is used by the system to support a number of services.

The buyer receives feedback that allows him to measure the efficiency of his search process, the nature of the products that are being reviewed and statistical reports on relevant product offerings. For instance, the Action Log could report how many candidates were presented, common reasons for rejecting a large number of candidates (for example, many candidates were rejected because they lacked a master's degree), statistical profiles of the candidates matched in the database and those selected for further review. The Action Log could be used to audit compliance with equal employment opportunity requirements. Similar statistics could be gathered to summarize multiple searches.

The seller receives feedback based upon the Action Log that can be used to assess his product or its presentation. This report may be presented by mail or by means of the network depending upon the specific situation. In the personnel search example, the candidate could be informed of the number of times he was matched, reviewed, selected for interview or rejected. The candidate could also receive a report of specific rejection reasons as well as statistical reports of relevant Buyer's Profile criteria that could lead to his seeking additional training or job experience or modifying his career objectives.

A powerful aspect of the system in the personnel application is its use to address issues of bias in hiring practices. Certain personal information on candidates is collected at the same time as the Product Profile. This information is defined by federal or local laws or by corporate policy. It includes the candidate's age, sex, religion, national origin, etc. This information is not a part of the Product Profile because it is not used in the database matching process. Further it is not presented to the hiring manager by the Buyer's Interface, which specifically denies access to it. Thus the system acts to ensure that, at least in the first cut stage, candidates are reviewed only upon the basis of their profile information.

The record of the buyer's actions in the Action Log provides a basis for auditing the later stages of the hiring process. It contains a record of the review process for all candidates as well as specific rejection reasons. As such it supports an objective measure of compliance with hiring regulations.

The Action Log also is the basis for billing for system services. In general, both buyers and sellers would pay a subscription fee for access to the system. Charges could also be made for connect time, communications costs, database storage and other system services. Each match that results in a completed transaction could also incur a charge to the buyer or seller depending upon the application.

The Network

Referring again to FIG. 1, because the availability of network facilities varies greatly among users, and network technology continues to evolve, the system is designed to function over a variety of networks, and adapt to the network currently available. The Seller's and Buyer's Interfaces can be tailored to individual sellers' and buyers' network bandwidth and cost considerations. The nature of the network will affect cost, degree of interactivity, and types of media available to the seller and buyer.

In the simplest and lowest-cost cases, either a seller or a buyer can communicate with the product database by mailing a diskette with either a Product Profile or a Buyer's Profile. The Seller's or Buyer's Interface may run on the seller's or buyer's personal computer in a standalone mode. The diskette is submitted to the database server to do the database update for the seller or the database query for the buyer. For a buyer, a diskette is mailed back with Product Profile hits.

Alternately, high-bandwidth channels may connect Seller's Interface 300 to database server 200, or database server 200 to Buyer's Interface 500, to deliver full-motion video interactively. These connections may be Ethernet, higher capacity LAN networks, high speed ISDN, T1 or ATM wide area networks.

Mid-bandwidth channels, such as wide area networks using basic rate ISDN or high speed modem connections, could be accommodated either by reducing the quality of the video or by lengthening response time.

Alternately, low-bandwidth channels, such as a low-speed modem, could be accommodated by reducing quality of video, increasing length of response time, or reducing some of the content, for instance by providing text and voice but not video.

Buyers may be automatically notified of new products of interest. The database server 200 would evaluate all newly entered product information against each active Buyer's Profile. When a new product is added to the database that would have been selected in an earlier interactive session, a notification is sent to the appropriate buyer, by FAX, a voice message or electronic mail.

Additional Applications

There are a large number of additional applications that involve similar purchasing decisions, and to which the system is applicable. Applications that are transaction-oriented and require matching of criteria as a part of the decision making process can use a system that identifies and mechanizes a core set of criteria, augments it with multimedia information and automates the process of collection and presentation of the information.

Referring to FIG. 8a, an example of such an application is the matching of entrepreneurs and investors. The goal is to characterize the nature of a business opportunity and match it to the interests of an investor. In this application the required Profile Template of the Product Profile could contain information such as:

business nature: manufacturing, pharmaceutical, transportation, etc.

technologies involved: electronics, materials, chemical, etc.

stage of development of the enterprise geographical location capital requirements In addition to question and answer interviews similar to those of the personnel search application, the multimedia information would include pro forma financial information in spreadsheet format, product specifications, video product demonstrations, and presentations by the company principals. The buyer's review process is similar to that of the personnel search application with the addition of the financial parameters.

Referring to FIG. 8b, real estate has a reduced emphasis upon the "interview" material. The Product Profile could describe zoning, location, transportation accessibility, and/or capacity, as well as financial information. The multimedia database could include floor plans and engineering drawings.

Theatrical casting is an extension of the personnel search application, with more emphasis on video clips of prior work or "automated auditions" for a particular part.

Consumer or commercial product selection involves use of a wide area network coupled with a broad band video delivery "highway". As the system is designed to be network-independent, it can provide the coupling of structured information and multimedia presentation to broker transactions of consumer goods and services. Automobiles, travel, white goods, and fashions are further examples of applications that the system can address.

Other embodiments are within the following claims.

What is claimed is:

1. A computer-implemented system for assisting an employer's hiring decision from among a pool of candidates, the system comprising:

a computer, a database stored on said computer containing information, including multimedia information, descriptive of respective ones of said candidates, descriptive information for one of said candidates comprising a plurality of profile vectors, each comprising multiple independently-represented database entries of said database, the entries of each said profile vector being associated with the other entries in said profile vector but independent of entries of other said profile vectors for the same candidate;

a seller interface executed on a computer for enabling said candidates to interactively enter said descriptive information, including said multimedia information and said profile vectors, into said database; and a buyer interface executed on a computer for:

enabling said employer interactively to specify a description of a desired prospective employee, including specifying desired combinations of the associated entries of said profile vectors, matching said desired employee description against candidate descriptive information stored in said database, the matching using approximate-comparison logic to select, from among said descriptive information, those at least approximately matching said desired employee description, the approximate-comparison logic including "want", "must", and weighted logic requirements;

displaying to said employer a list of summary descriptions of said selected descriptive information, the summary descriptions of said list being rank-ordered according to the closeness of the match to said desired employee profile wherein some entries of said profile do not match said candidate entered descriptive information, and making perceptible said multimedia information in response to an interactive selection request from among said rank-ordered list by said employer.

2. The system of claim 1, wherein:

said seller interface requires entry by said candidate of at least a predefined minimum set of information about said candidate before storing said descriptive information about said candidate into said database.

3. The system of claim 1, wherein:

said buyer interface records selecting or reviewing actions of said employer in an action log for later review.

4. The system of claim 3, further comprising:

a report generator for extracting information from said action log to provide feedback information to said candidate.

5. The system of claim 3, further comprising:

a report generator for extracting information from said action log to provide feedback information to said employer.

6. The system of claim 1, further comprising:

automatic notification means for notifying said employer of descriptive information newly-entered into said database that matches selection criteria previously specified by said employer.

7. The system of claim 1, wherein said buyer interface further has three modes of operation, a first mode for specifying selection criteria for selecting descriptive information from said database, a second mode for presenting to said employer a summary of the descriptive information matching said selection criteria, and a third mode for providing to said employer a detailed presentation of selected descriptive information matching said selection criteria.

8. The system of claim 1, wherein:

at least one of said seller interface and said buyer interface has two modes, a first mode having relatively slower interactivity for use with a low-bandwidth communications channel for communicating with said database, and a second mode having relatively faster interactivity for use with a high-bandwidth channel, and means for selecting the mode depending upon the channel being used.

9. A computer-implemented method for interactively assisting an employer's hiring decision from among a pool of available candidates the method comprising the steps of:

accepting from an employer, an employer profile description of a candidate he wishes to employ;

matching said employer profile against candidate profiles stored in said database, said candidate profiles including multimedia information descriptive of respective ones of said candidates, the matching using approximate-comparison logic to select, from among said candidate profiles, those at least approximately matching said employer profile, the approximate-comparison logic including "want", "must", and weighted logic requirements;

displaying to said employer a list of summary descriptions of said selected candidate profiles, the summary descriptions of said list being rank-ordered according to the closeness of the match to said employer profile wherein some entries of said employer profile do not match said candidate;

accepting from said employer choices from among said displayed summary candidate profiles; and making perceptible to said employer said multimedia information associated with said employer choices of candidate profiles.

10. The method of claim 9, further comprising the steps of:

storing, as part of said candidate profile information for one of said candidates, profile vectors of information, the candidate information of each said profile vector being associated with other candidate information in said profile vector but independent of information of other said profile vectors for the same candidate, and said matching step comprises the steps of matching said employer profile against said profile vectors.

11. The method of claim 9, further comprising the steps of:

accumulating selection preferences of a plurality of employers each of whom have reviewed a plurality of said selected candidates, and presenting said accumulated preferences to said employer, for assisting said employer in making a final hiring decision from among said selected candidates.

* * * * *

UNITED STATES PATENT AND TRADEMARK OFFICE
CERTIFICATE OF CORRECTION

PATENT NO.   : 5,592,375
DATED        : January 7, 1997
INVENTOR(S)  : Salmon, et al.

It is certified that error appears in the above-identified patent and that said Letters Patent is hereby corrected as shown below:

Cover Page, attached PTO 892 citing U.S. Patents not listed.

Col. 1, line 59, replace "have," with --have--;

Col. 2, line 18, replace "Purchase" with --•Purchase--;

Col. 2, line 20, replace "Purchase" with --•Purchase--;

Col. 2, line 21, replace "Hiring" with --•Hiring--;

Col. 2, line 23, replace "Exploration" with --•Exploration--;

Col. 2, line 24, replace "Among" with --•Among--;

Col 3, line 64, replace "the" with --•the--;

Col 3, line 66, replace "last" with --•last--;

UNITED STATES PATENT AND TRADEMARK OFFICE
CERTIFICATE OF CORRECTION

PATENT NO. : 5,592,375

DATED : January 7, 1997

INVENTOR(S) : Salmon, et al.

It is certified that error appears in the above-identified patent and that said Letters Patent is hereby corrected as shown below:

Col. 4, line 1, replace "compensation" with --•compensation--;

Col. 4, line 3, replace "education" with --•education--;

Col. 4, line 44, replace "the" with --•the--;

Col. 4, lines 45 and 47, replace "at" with --•at--;

Col. 5, line 19, replace "Product Component" with --Product, Component--

Col. 7, line 14 replace ""Administrative" "Marketing/Sales"", with --"Administrative", "Marketing/Sales",--

Col. 10, line 40, replace "Combinations," with --Combinations--

Signed and Sealed this

Nineteenth Day of January, 1999

Attest:

Attesting Officer

*Acting Commissioner of Patents and Trademarks*